(12) United States Patent
Kasai et al.

(10) Patent No.: US 9,228,470 B2
(45) Date of Patent: Jan. 5, 2016

(54) HONEYCOMB STRUCTURE

(71) Applicant: NGK INSULATORS, LTD., Nagoya (JP)

(72) Inventors: Yoshiyuki Kasai, Nagoya (JP); Yoshimasa Omiya, Nagoya (JP); Kazumi Mase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 108 days.

(21) Appl. No.: 14/027,557

(22) Filed: Sep. 16, 2013

(65) Prior Publication Data

US 2014/0010720 A1    Jan. 9, 2014

Related U.S. Application Data

(63) Continuation of application No. PCT/JP2012/057208, filed on Mar. 21, 2012.

(30) Foreign Application Priority Data

Mar. 25, 2011   (JP) ................................. 2011-067508

(51) Int. Cl.
*B01D 39/06* (2006.01)
*B01D 39/14* (2006.01)
*B01D 39/20* (2006.01)
(Continued)

(52) U.S. Cl.
CPC ............ *F01N 3/2803* (2013.01); *F01N 3/2026* (2013.01); *F01N 3/2828* (2013.01); *H05B 3/42* (2013.01); *F01N 2240/16* (2013.01); *F01N 2330/06* (2013.01); *F01N 2330/34* (2013.01);

(Continued)

(58) Field of Classification Search
CPC .. F01N 3/027; F01N 2240/16; B01D 46/0057
See application file for complete search history.

(56) References Cited

U.S. PATENT DOCUMENTS 4,505,107 A * 3/1985 Yamaguchi et al. ............ 60/303
5,245,825 A    9/1993 Ohhashi et al.
(Continued)

FOREIGN PATENT DOCUMENTS

EP    2 375 018 A2   10/2011
JP    04-280086 A1   10/1992
(Continued)

OTHER PUBLICATIONS

International Search Report and Written Opinion dated Jul. 3, 2012.
(Continued)

*Primary Examiner* — Amber Orlando
(74) *Attorney, Agent, or Firm* — Burr & Brown, PLLC

(57) ABSTRACT

A honeycomb structure includes a honeycomb structure section having porous partition walls, and an outer peripheral wall; and a pair of electrode sections, each of the pair of electrode sections are formed into a band shape, the one electrode section is disposed on an opposite side to the other electrode section via a center O of the honeycomb structure section, a shape of the cells is a quadrangular shape or a hexagonal shape, and in the cross section perpendicular to the extending direction of the cells and including the electrode sections, a straight line parallel to a diagonal line connecting two facing vertexes of the one cell and passing the center of the honeycomb structure section is a reference line L, and each of the electrode sections is disposed at a position to intersect with the at least one reference line L.

13 Claims, 6 Drawing Sheets

(51) Int. Cl.
*B01D 50/00* (2006.01)
*B01D 24/00* (2006.01)
*F01N 3/28* (2006.01)
*F01N 3/20* (2006.01)
*H05B 3/42* (2006.01)

(52) U.S. Cl.
CPC ..... *H05B 2203/022* (2013.01); *H05B 2203/024* (2013.01); *Y02T 10/26* (2013.01)

(56) References Cited

U.S. PATENT DOCUMENTS

| | | | | |
|---|---|---|---|---|
| 5,259,190 | A | * | 11/1993 | Bagley et al. .................. 60/300 |
| 5,266,278 | A | * | 11/1993 | Harada et al. ................. 422/174 |
| 5,399,841 | A | | 3/1995 | Abe et al. |
| RE35,134 | E | * | 12/1995 | Mizuno et al. ................ 422/175 |
| 5,651,248 | A | * | 7/1997 | Kawamura ..................... 60/286 |
| 5,800,787 | A | * | 9/1998 | Kato et al. .................... 422/174 |
| 5,852,285 | A | * | 12/1998 | Kato et al. .................... 219/553 |
| 5,861,611 | A | * | 1/1999 | Kato et al. .................... 219/552 |
| 8,158,908 | B2 | * | 4/2012 | Konieczny et al. ........... 219/202 |
| 8,530,803 | B2 | * | 9/2013 | Sakashita et al. ............. 219/553 |
| 8,535,405 | B2 | * | 9/2013 | Noguchi et al. ................ 55/523 |
| 8,597,585 | B2 | * | 12/2013 | Sakashita et al. ............. 422/174 |
| 8,716,635 | B2 | * | 5/2014 | Noguchi et al. ............. 219/553 |
| 8,907,256 | B2 | * | 12/2014 | Hashimoto et al. ........... 219/553 |
| 2005/0042151 | A1 | * | 2/2005 | Alward et al. ................ 422/177 |
| 2009/0090089 | A1 | * | 4/2009 | Phelps et al. ................ 55/282.3 |
| 2012/0076698 | A1 | | 3/2012 | Ishihara |
| 2012/0076699 | A1 | * | 3/2012 | Ishihara ........................ 422/174 |
| 2013/0043236 | A1 | * | 2/2013 | Sakashita et al. ............. 219/553 |

FOREIGN PATENT DOCUMENTS

| | | |
|---|---|---|
| JP | 05-115796 A1 | 5/1993 |
| JP | 06-066132 A1 | 3/1994 |
| JP | 08-141408 A1 | 6/1996 |
| JP | 2818051 B2 | 10/1998 |
| JP | 2011-246340 A1 | 12/2011 |
| JP | 2012-031738 A1 | 2/2012 |
| JP | 2012-092820 A1 | 5/2012 |

OTHER PUBLICATIONS

Extended European Search Report (Application No. 12764924.2) dated Dec. 15, 2014.

* cited by examiner

HONEYCOMB STRUCTURE

BACKGROUND OF THE INVENTION

1. Field of the Invention

The present invention relates to a honeycomb structure, and more particularly, it relates to a honeycomb structure which is a catalyst carrier and also functions as a heater when a voltage is applied thereto and which has an excellent heat shock resistance.

2. Description of Related Art

Heretofore, a honeycomb structure made of cordierite, onto which a catalyst is loaded, has been used in treatment of harmful substances in an exhaust gas discharged from a car engine. Moreover, it is known that a honeycomb structure formed by a sintered silicon carbide body has been used in purification of the exhaust gas. Here, when the exhaust gas is treated by the catalyst loaded onto the honeycomb structure, a temperature of the catalyst needs to be raised up to a predetermined temperature. However, the catalyst temperature is low at the start of the engine, which has caused the problem that the exhaust gas is not sufficiently purified.

To solve the problem, it has been disclosed that a honeycomb structure made of a conductive ceramic material and having both ends provided with electrodes is used as a catalyst carrier with a heater (e.g., see Patent Document 1). Moreover, it has been disclosed that a honeycomb heater constituted of a conductive honeycomb structure having a large number of through holes and two energizing means arranged on a side surface of this honeycomb structure is used as the catalyst carrier (e.g., see Patent Document 2).

PRIOR ART DOCUMENT

Patent Documents

[Patent Document 1] JP-A-H08-141408
[Patent Document 2] JP-A-H06-66132

SUMMARY OF THE INVENTION

As to a catalyst carrier with a heater disclosed in Patent Document 1, when the catalyst carrier with the heater is mounted on a car and used, electrodes are directly exposed to an exhaust gas, thereby easily deteriorating the electrodes and increasing a resistance value sometimes.

In a honeycomb heater of Patent Document 2, a side surface of a honeycomb structure is provided with energizing means, and hence the energizing means are not directly exposed to the exhaust gas. Consequently, there are not caused the problems that the electrodes easily deteriorate and that the resistance value increases as in the catalyst carrier with the heater disclosed in Patent Document 1. However, when the honeycomb heater is rapidly heated by supplying the exhaust gas or rapidly cooled by stopping the supply of the exhaust gas, a difference in temperature is made between the inside and the outside of the honeycomb heater. Therefore, a large heat stress is generated due to this temperature difference, and cracks and the like are generated in the honeycomb heater sometimes.

The present invention has been developed in view of the above-mentioned problems, and an object thereof is to provide a honeycomb structure which is a catalyst carrier and also functions as a heater when a voltage is applied thereto and which has an excellent heat shock resistance.

According to the present invention, a honeycomb structure is provided as follows.

[1] A honeycomb structure including a tubular honeycomb structure section having porous partition walls with which a plurality of cells extending from one end surface to the other end surface are formed to become through channels of a fluid, and an outer peripheral wall positioned in the outermost periphery; and a pair of electrode sections arranged on a side surface of the honeycomb structure section, wherein an electrical resistivity of the honeycomb structure section is from 1 to 200 Ωcm, each of the pair of electrode sections is formed into a band shape extending in a cell extending direction of the honeycomb structure section, in a cross section perpendicular to the cell extending direction, the one electrode section in the pair of electrode sections is disposed on an opposite side to the other electrode section in the pair of electrode sections via the center of the honeycomb structure section, a shape of the cells in the cross section perpendicular to the cell extending direction is a quadrangular shape or a hexagonal shape, and in the cross section perpendicular to the cell extending direction and including the electrode sections, a straight line parallel to a diagonal line connecting two facing vertexes of the one cell and passing the center of the honeycomb structure section is a reference line, and each of the electrode sections is disposed at a position to intersect with the at least one reference line.

[2] The honeycomb structure according to the above [1], wherein in the cross section perpendicular to the cell extending direction, an angle of 0.5 times a center angle of each of the electrode sections is from 15 to 65°.

[3] The honeycomb structure according to the above [1] or [2], wherein a thickness of the electrode section is from 0.025 to 3 mm.

[4] The honeycomb structure according to any one of the above [1] to [3], wherein the shape of the cells in the cross section perpendicular to the cell extending direction is the hexagonal shape.

[5] The honeycomb structure according to any one of the above [1] to [4], wherein each of the electrode sections is disposed to intersect with the two or more reference lines.

[6] The honeycomb structure according to any one of the above [1] to [5], wherein the electrical resistivity of the electrode section is from 0.01 to 100 Ωcm.

[7] The honeycomb structure according to any one of the above [1] to [6], wherein a conductor having an electrical resistivity lower than the electrical resistivity of the electrode section is disposed on the surface of the electrode section.

A honeycomb structure of the present invention includes a tubular honeycomb structure section having porous partition walls and an outer peripheral wall positioned in the outermost periphery; and a pair of electrode sections arranged on a side surface of the honeycomb structure section. Moreover, in the honeycomb structure of the present invention, each of the pair of electrode sections is formed into a band shape extending in a cell extending direction of the honeycomb structure section. In the honeycomb structure of the present invention, in a cross section perpendicular to the cell extending direction, the one electrode section in the pair of electrode sections is disposed on an opposite side to the other electrode section in the pair of electrode sections via the center of the honeycomb structure section. In the honeycomb structure of the present invention, a shape of the cells in the cross section perpendicular to the cell extending direction is a quadrangular shape or a hexagonal shape. Furthermore, here, in the cross section perpendicular to the cell extending direction and including the electrode sections, a straight line parallel to a diagonal line connecting two facing vertexes of the one cell and passing the center of the honeycomb structure section is a reference line. In the honeycomb structure of the present invention, each of the electrode sections is disposed at a position to intersect with the at least one reference line. The electrode sections are arranged in this manner, and hence the honeycomb structure of the present invention has an excellent heat shock resistance. Specifically, when the honeycomb structure is disposed in an exhaust system of an internal combustion engine and used, generation of a large stress in the honeycomb structure section can be suppressed even at a rapid temperature change. Moreover, "an electrical resistivity of the honeycomb structure section is from 1 to 200 Ωcm", and hence even when a current is allowed to flow by use of a high voltage power source, the current does not excessively flow, and the honeycomb structure can suitably be used as a heater.

DETAILED DESCRIPTION OF THE INVENTION

Hereinafter, embodiments of the present invention will be described. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Figure 1:
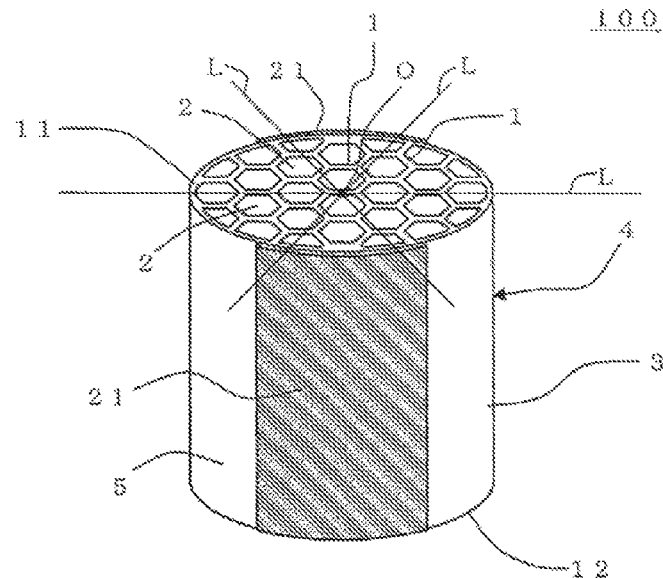
FIG. 1 is a perspective view schematically showing one embodiment of a honeycomb structure of the present invention.
Figure 2:
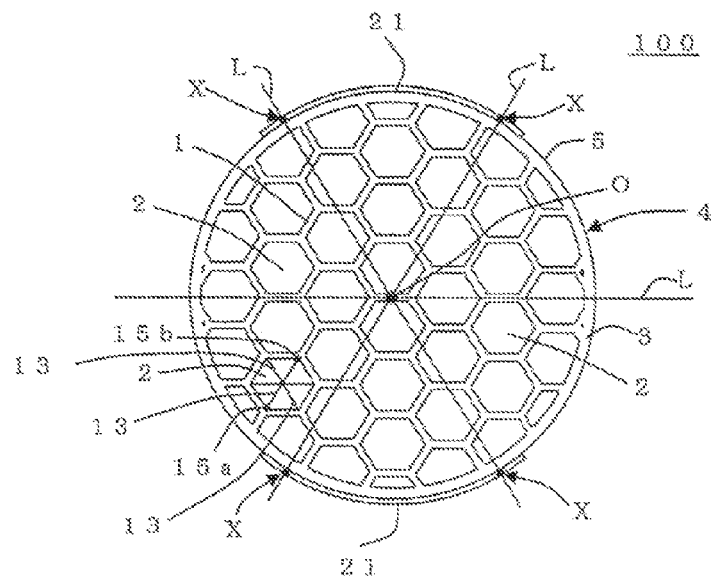
FIG. 2 is a schematic view showing a cross section perpendicular to a cell extending direction in the one embodiment of the honeycomb structure of the present invention.

[1] Honeycomb Structure:

According to one embodiment of a honeycomb structure of the present invention, a honeycomb structure 100 shown in FIG. 1 and FIG. 2 includes a tubular honeycomb structure section 4, and a pair of electrode sections 21 and 21 arranged on a side surface 5 of the honeycomb structure section 4. The honeycomb structure section 4 has porous partition walls 1 with which a plurality of cells 2 extending from one end surface 11 to the other end surface 12 are formed to become through channels of a fluid, and an outer peripheral wall 3 positioned in the outermost periphery. In the honeycomb structure 100, an electrical resistivity of the honeycomb structure section 4 is from 1 to 200 Ωcm. In the honeycomb structure 100, each of the pair of electrode sections 21 and 21 is formed into a band shape extending in an extending direction of the cells 2 of the honeycomb structure section 4. Moreover, in a cross section perpendicular to the extending direction of the cells 2, the one electrode section 21 in the pair of electrode sections 21 and 21 is disposed on an opposite side to the other electrode section 21 in the pair of electrode sections 21 and 21 via a center O of the honeycomb structure section 4. In the honeycomb structure 100, a shape of the cells 2 in the cross section perpendicular to the extending direction of the cells 2 is a quadrangular shape or a hexagonal shape. Furthermore, in the cross section perpendicular to the extending direction of the cells 2 and including the electrode sections 21, a straight line parallel to a diagonal line 13 connecting two facing vertexes of the one cell 2 and passing the center O of the honeycomb structure section 4 is a reference line L. At this time, in the honeycomb structure 100, each of the electrode sections 21 and 21 is disposed at a position to intersect with the at least one reference line L.

FIG. 1 is a perspective view schematically showing the one embodiment of the honeycomb structure of the present invention. FIG. 2 is a schematic view showing the cross section perpendicular to the cell extending direction in the one embodiment of the honeycomb structure of the present invention. That is, FIG. 2 is a schematic view showing the cross section including the pair of electrode sections 21 and 21 and being perpendicular to the extending direction of the cells 2.

In the honeycomb structure 100, each of the pair of electrode sections 21 and 21 is formed into the band shape extending in the extending direction of the cells 2 of the honeycomb structure section 4. In the cross section perpendicular to the extending direction of the cells 2, the one electrode section 21 in the pair of electrode sections 21 and 21 is disposed on the opposite side to the other electrode section 21 in the pair of electrode sections 21 and 21 via the center O of the honeycomb structure section 4. The shape of the cells 2 in the cross section perpendicular to the extending direction of the cells 2 is the quadrangular shape or the hexagonal shape. Furthermore, in the cross section perpendicular to the extending direction of the cells 2 and including the electrode sections 21, the straight line parallel to the diagonal line 13 connecting the two facing vertexes of the one cell 2 and passing the center O of the honeycomb structure section 4 is the reference line L. At this time, each of the electrode sections 21 and 21 is disposed at the position to intersect with the at least one reference line L. Therefore, the honeycomb structure 100 has an excellent heat shock resistance. Specifically, when the honeycomb structure is disposed in an exhaust system of an internal combustion engine and used, generation of a large stress in the honeycomb structure section can be suppressed even at a rapid temperature change. In other words, the electrode section 21 is disposed in a portion where the large heat stress is generated, and hence cracks are not easily generated, so that the honeycomb structure has the excellent heat shock resistance. Moreover, in the honeycomb structure 100, the electrical resistivity of the honeycomb structure section 4 is from 1 to 200 Ωcm. Therefore, even when a current is allowed to flow by use of a high voltage power source, the current does not excessively flow, and the honeycomb structure can suitably be used as a heater.

It is to be noted that when "in the cross section perpendicular to the extending direction of the cells 2, the one electrode section 21 in the pair of electrode sections 21 and 21 is disposed on the opposite side to the other electrode section 21 in the pair of electrode sections 21 and 21 via the center O of the honeycomb structure section 4", definition is as follows. That is, it is meant that the pair of electrode sections 21 and 21 are arranged in the honeycomb structure section 4 so as to have a positional relation in which in the cross section perpendicular to the extending direction of the cells 2, an angle β formed by a line segment (A) and a line segment (B) is in a range of 170 to 190°. The line segment (A) is a line segment connecting a center point of the one electrode section 21 (the center point in "a peripheral direction of the honeycomb structure section 4") and the center O of the honeycomb structure section 4. The line segment (B) is a line segment connecting a center point of the other electrode section 21 (the center point in "the peripheral direction of the honeycomb structure section 4") and the center O of the honeycomb structure section 4. The angle β is an angle around "the center O".

As shown in FIG. 1 and FIG. 2, in the honeycomb structure 100 of the present embodiment, the pair of electrode sections 21 and 21 are arranged on the side surface 5 of the honeycomb structure section 4. The honeycomb structure 100 of the present embodiment generates heat, when a voltage is applied between the pair of electrode sections 21 and 21. The voltage to be applied is preferably from 12 to 900 V, and further preferably from 64 to 600 V.

As shown in FIG. 1, in the honeycomb structure 100 of the present embodiment, (i) each of the pair of electrode sections 21 and 21 is formed into the band shape extending in the extending direction of the cells 2 of the honeycomb structure section 4. Moreover, (ii) in the cross section perpendicular to the extending direction of the cells 2, the one electrode section 21 in the pair of electrode sections 21 and 21 is disposed on the opposite side to the other electrode section 21 in the pair of electrode sections 21 and 21 via the center O of the honeycomb structure section 4.

Figure 3:
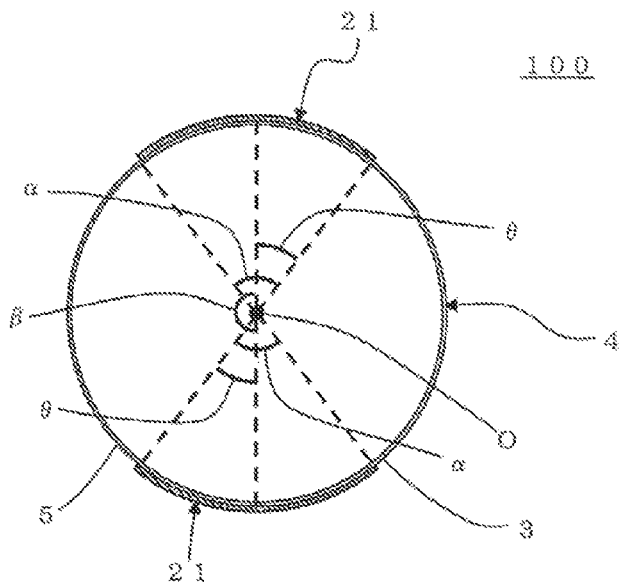
FIG. 3 is a schematic view showing the cross section perpendicular to the cell extending direction in the one embodiment of the honeycomb structure of the present invention.

In the honeycomb structure 100 of the present embodiment, as shown in FIG. 3, further in the cross section perpendicular to the extending direction of the cells 2, an angle (an angle θ of 0.5 times a center angle α) of 0.5 times the center angle α of each of the electrode sections 21 and 21 is from 15 to 65°. Moreover, the angle θ of 0.5 times the center angle α is further preferably from 20 to 60°, and especially preferably from 30 to 55°. In this way, the above (i) and the above (ii) are accomplished, and further in the cross section perpendicular to the extending direction of the cells 2, the angle θ of 0.5 times the center angle α of each of the electrode sections 21 and 21 is from 15 to 65°. In consequence, when the voltage is applied between the pair of electrode sections 21 and 21, a deviation of the current flowing through the honeycomb structure section 4 can more effectively be suppressed. In other words, the current flowing through the honeycomb structure section 4 can be allowed to more evenly flow. Consequently, a deviation of heat generation in the honeycomb structure section 4 can be suppressed. When the angle θ of 0.5 times the center angle α is smaller than 15°, the current does not spread through the honeycomb structure section 4, so that the heat might be generated right under electrodes in a concentrated manner. On the other hand, in excess of 65°, the current passes through the outer peripheral wall, and a center temperature might not rise. "The center angle α of the electrode section 21" is an angle (a smaller angle) formed by two line segments connecting both ends of the electrode section 21 to the center O of the honeycomb structure section 4. FIG. 3 is a schematic view showing the cross section perpendicular to the cell extending direction in the one embodiment of the honeycomb structure of the present invention.

Moreover, "the angle θ of 0.5 times the center angle α" of the one electrode section 21 is preferably a size of 0.8 to 1.2 times "the angle θ of 0.5 times the center angle α" of the other electrode section 21, and further preferably a size of 1.0 time (the same size). In the above range, when the voltage is applied between the pair of electrode sections 21 and 21, the deviation of the current flowing through the honeycomb structure section 4 can more effectively be suppressed. In consequence, the deviation of the heat generation in the honeycomb structure section 4 can more effectively be suppressed.

In the honeycomb structure 100 of the present embodiment, for example, as shown in FIG. 1, the electrode section 21 has a shape obtained by bending a planar rectangular member along an outer periphery of a cylindrical shape. Here, a shape at deformation of the bent electrode section 21 into a non-bent planar member will be referred to as "the planar shape" of the electrode section 21. The above "planar shape" of the electrode section 21 shown in FIG. 1 is a rectangular shape. Moreover, "an outer peripheral shape of the electrode section" means "the outer peripheral shape in the planar shape of the electrode section".

In the honeycomb structure 100 of the present embodiment, as shown in FIG. 1, the outer peripheral shape of the band-like electrode section 21 may be a rectangular shape. In another preferable configuration of the honeycomb structure of the present embodiment, the outer peripheral shape of the band-like electrode section 21 is "a rectangular shape including curved corner portions". In still another preferable configuration, the outer peripheral shape of the band-like electrode section 21 is "a rectangular shape including linearly chamfered corner portions". A complex application of "a curved shape" and "a linear shape" is also preferable. That is, the outer peripheral shape of the band-like electrode section 21 is also preferably a rectangular shape including at least one corner portion having "the curved shape" and at least one corner portion having "the linearly chamfered shape". Furthermore, "the band shape" in the present description can be called a sheet shape or a film shape. That is, "the electrode section" in the present description does not include an outward projecting portion such as "an electrode terminal projecting portion" in the present description.

As described above, the outer peripheral shape of the electrode section 21 is "the rectangular shape including the curved corner portions" or "the rectangular shape including the linearly chamfered corner portions", so that the heat shock resistance of the honeycomb structure can further be enhanced. When the corner portion of the electrode section is formed at right angles, a stress in the vicinity of "the corner portion of the electrode section" in the honeycomb structure section tends to be relatively higher than that of the other portions. On the other hand, when the corner portion of the electrode section is curved or linearly chamfered, it is possible to decrease the stress in the vicinity of "the corner portion of the electrode section" in the honeycomb structure section.

Figure 4:
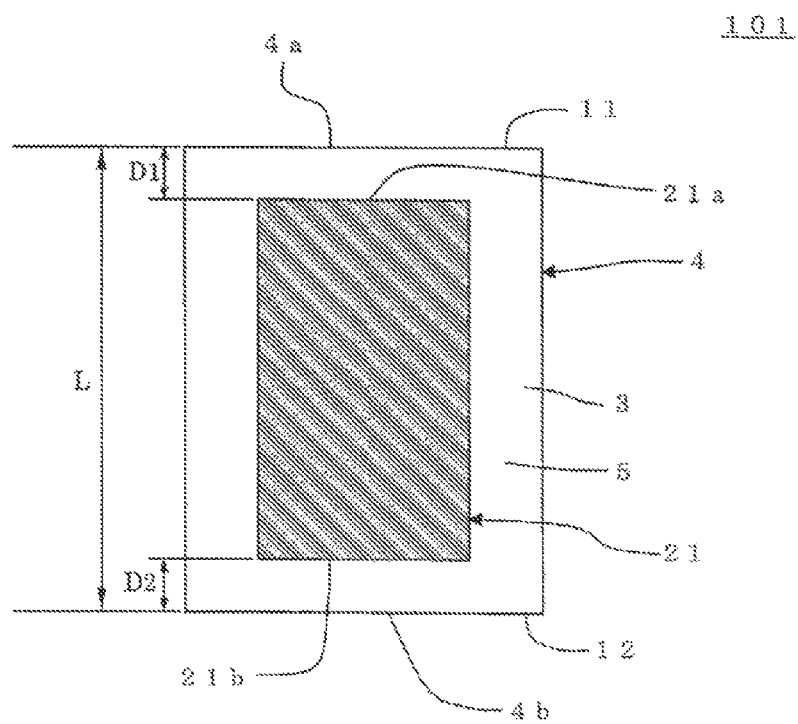
FIG. 4 is a front view schematically showing another embodiment of the honeycomb structure of the present invention.

In the honeycomb structure of the present invention, there is not any special restriction on the electrode sections, as long as each electrode section is formed into the band shape extending in the cell extending direction of the honeycomb structure section. For example, each of the pair of electrode sections 21 and 21 may be formed along a region between both ends of the honeycomb structure section 4 as shown in FIG. 1, or does not have to be formed along the region between both the ends of the honeycomb structure section 4 as shown in FIG. 4. That is, a space may be present between each end of the honeycomb structure section 4 and each end of the electrode section 21. In this case, when the electrode section is formed along the region between both the ends of the honeycomb structure section 4, uniform heat generation by energization can be realized. Moreover, when the electrode section is formed so that the electrode section does not extend along the region between both the ends of the honeycomb structure section 4, a large stress is not easily generated in the vicinity of each end of the honeycomb structure section 4, i.e., the vicinity of a boundary between the honeycomb structure section and the electrode section 21. Therefore, the generation of the cracks can be prevented. FIG. 4 is a front view schematically showing this further embodiment of the honeycomb structure of the present invention.

Each of the pair of electrode sections 21 and 21 is not formed along the region between both the ends of the honeycomb structure section 4. Specifically, a distance D1 is preferably from 1 to 10% of a length L of the honeycomb structure section 4 in the cell extending direction as shown in FIG. 4. The distance D1 is a distance from one end 4a of the honeycomb structure section 4 in the cell extending direction to "an end 21a of the electrode section 21 (one end of the electrode section)" which faces "one end 4a side of the honeycomb structure section 4" in the cell extending direction. Furthermore, a distance D2 is preferably from 1 to 10% of the length L of the honeycomb structure section 4 in the cell extending direction. The distance D2 is a distance from the other end 4b of the honeycomb structure section 4 in the cell extending direction to "an end 21b of the electrode section 21 (the other end of the electrode section)" which faces "the other end 4b side of the honeycomb structure section 4" in the cell extending direction. Each of the distances D1 and D2 is further preferably from 2 to 8% of the length L of the honeycomb structure section 4.

As described above, in a honeycomb structure 101, both the distance D1 and the distance D2 are from 1 to 10% of the length L of the honeycomb structure section 4. It is to be noted that the distance D1 is the distance from the one end 4a of the honeycomb structure section 4 to the one end 21a of the electrode section 21. Moreover, the distance D2 is the distance from the other end 4b of the honeycomb structure section 4 to the other end 21b of the electrode section 21. In consequence, when the honeycomb structure 101 is disposed in an exhaust system of an internal combustion engine and used, generation of a large stress in the honeycomb structure section 4 can further effectively be suppressed even at a rapid temperature change. Furthermore, when a voltage is applied to the honeycomb structure 101, uniform heat generation can further effectively be realized. The distance D1 and the distance D2 are preferably the same distance, but may be different distances. Moreover, the distances D1 and D1 of the pair of electrode sections 21 and 21 are preferably the same distance, but may be different. Furthermore, the distances D2 and D2 of the pair of electrode sections 21 and 21 are preferably the same distance, but may be different.

When a side edge of each band-like electrode section along the cell extending direction is not a straight line parallel to the cell extending direction (e.g., when the side edge is inclined to the cell extending direction, or when the side edge is a wavy line), an intersection with the reference line may be present between the reference line and the outermost position of the above side edge. The intersection with the reference line is preferably present between the reference line and the innermost position of the side edge. It is to be noted that when the above side edge is not the straight line parallel to the cell extending direction, the cross section including the pair of electrode sections and being perpendicular to the cell extending direction, in which the reference line is to be drawn, is preferably a cross section in a portion where a length of the electrode section in the peripheral direction is shortest.

As described above, in the cross section including the pair of electrode sections 21 and 21 and being perpendicular to the extending direction of the cells 2, the straight line parallel to the diagonal line 13 connecting the two facing vertexes of the one cell 2 and passing the center of the honeycomb structure section 4 is the reference line L. At this time, in the honeycomb structure 100 shown in FIG. 1 and FIG. 2, each of the electrode sections 21 and 21 is disposed at the position to intersect with the at least one reference line L.

As to "the diagonal line connecting the two facing vertexes", when a cell shape is a quadrangular shape, two diagonal lines drawn in this quadrangular cell are meant. Therefore, when the cell shape is a hexagonal shape, a line segment drawn to connect one vertex and a third vertex counted clockwise from the one vertex is meant. Specifically, when the cell shape is the hexagonal shape, as shown in FIG. 2, the line segment is drawn to connect one vertex 15a and a third vertex 15b counted clockwise from the one vertex 15a. When the cell shape is the quadrangular shape, two "diagonal lines each connecting two facing vertexes" can be drawn. When the cell shape is the hexagonal shape, three "diagonal lines each connecting two facing vertexes" can be drawn.

Figure 5:
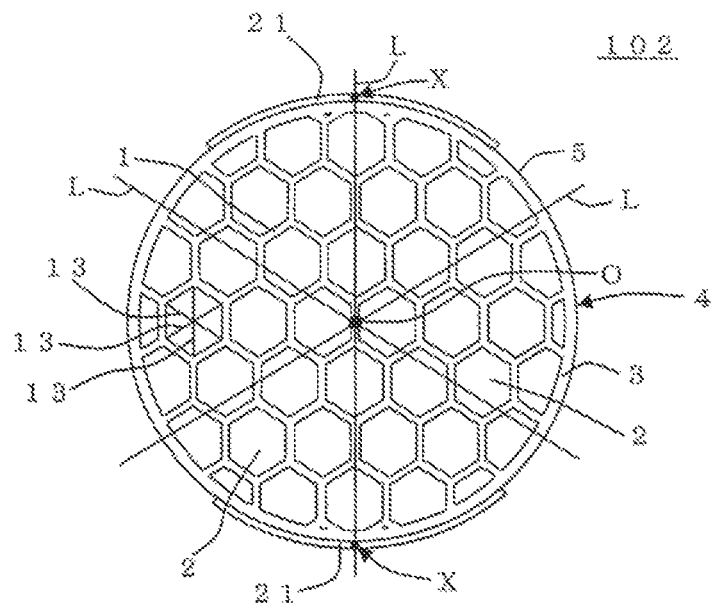
FIG. 5 is a schematic view showing a cross section perpendicular to a cell extending direction in still another embodiment of the honeycomb structure of the present invention.

In the honeycomb structure of the present invention, the respective electrode sections 21 and 21 may be arranged at the positions to intersect with "the at least one reference line L". As shown in FIG. 5, the respective electrode sections 21 and 21 may be arranged at the positions to intersect only with the one reference line L. That is, in the honeycomb structure of the present invention, the respective electrode sections 21 and 21 may be arranged so that each electrode section has one intersection X with the reference line L.

Figure 6:
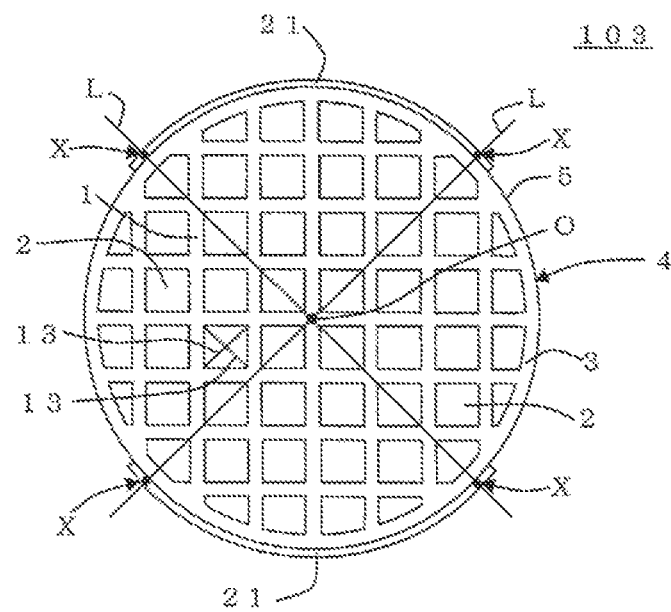
FIG. 6 is a schematic view showing a cross section perpendicular to a cell extending direction in a further embodiment of the honeycomb structure of the present invention.

In the honeycomb structure of the present invention, as described above, the respective electrode sections 21 and 21 may be arranged at the positions to intersect only with the one reference line L. As shown in FIG. 2 and FIG. 6, the respective electrode sections 21 and 21 are preferably arranged to intersect with two or more reference lines L (two or more intersections X between the electrode sections 21 and 21 and the reference lines L are present). Specifically, each electrode section is preferably disposed to intersect with the two reference lines L, and preferably disposed to intersect with three reference lines L. With the result that the respective electrode sections 21 and 21 are arranged to intersect with the two or more reference lines L, the honeycomb structure having a further excellent heat shock resistance can be obtained.

Moreover, as long as "each of the electrode sections is disposed at a position to intersect with the at least one reference line", the number of the reference lines intersecting with one electrode section and the number of the reference lines intersecting with the other electrode section may be the same, or may be different. For example, in the honeycomb structure 100 shown in FIG. 2, the number of the reference lines L intersecting with the one electrode section 21 and the number of the reference lines L intersecting with the other electrode section 21 are the same number (two). A honeycomb structure 102 shown in FIG. 5 is an example where the number of the reference lines L intersecting with the one electrode section 21 and the number of the reference lines L intersecting with the other electrode section 21 are the sane number (one). It is to be noted that the number of the reference lines intersecting with the one electrode section is the number of the intersections between the one electrode section and the reference lines. The number of the reference lines intersecting with the other electrode section is the number of the intersections between the other electrode section and the reference lines.

"The number of the intersections between the one electrode section and the reference lines is different from the number of the intersections between the other electrode section and the reference lines". Specifically, the pair of electrode sections are formed sometimes so that the number of the intersections between the one electrode section and the reference lines is one, whereas the number of the intersections between the other electrode section and the reference lines is two. Moreover, the pair of electrode sections are formed sometimes so that the number of the intersections between the one electrode section and the reference lines is two, whereas the number of the intersections between the other electrode section and the reference lines is three. Specifically, when the length of the one electrode section in the peripheral direction is different from the length of the other electrode section in the peripheral direction, the number of the intersections varies sometimes. Furthermore, even when the length of the one electrode section in the peripheral direction and the length of the other electrode section in the peripheral direction are the same, the number of the intersections varies sometimes as in a case where the pair of electrode sections 21 and 21 are arranged in such a positional relation that the angle 3 is, for example, 170°, or the like.

In the honeycomb structure of the present invention, a total of heat capacities of the pair of electrode sections is preferably from 2 to 150% of a heat capacity of the whole outer peripheral wall. In such a range, an amount of heat to be accumulated in each electrode section decreases, and the heat shock resistance of the honeycomb structure further enhances. Therefore, when the honeycomb structure is disposed in the exhaust system of the internal combustion engine and used, the generation of the large stress in the honeycomb structure section can be suppressed even at the rapid temperature change. The total of the heat capacities of the pair of electrode sections is further preferably not more than the heat capacity of the whole outer peripheral wall (i.e., from 2 to 100%), and is especially preferably smaller than the heat capacity of the whole outer peripheral wall. In consequence, the amount of the heat to be accumulated in each electrode section further decreases, and the heat shock resistance of the honeycomb structure further enhances. Therefore, when the honeycomb structure is disposed in the exhaust system of the internal combustion engine and used, the generation of the large stress in the honeycomb structure section can further be suppressed even at the rapid temperature change. The total of the heat capacities of the pair of electrode sections is a value obtained on the basis of a volume of each electrode section in consideration of a porosity, a specific gravity of a material and specific heat by a heat capacity calculating method. The above "volume of the electrode section" is a volume of each of the electrode sections which is calculated using an average thickness and electrode angle (the center angle $\alpha$ in FIG. 3) of the electrode section which are measured by an optical microscope. The heat capacity of the whole outer peripheral wall is a value obtained on the basis of a volume of the outer peripheral wall in consideration of the porosity, the specific gravity of the material and the specific heat by the heat capacity calculating method. The above "volume of the outer peripheral wall" is a volume of the outer peripheral wall which is calculated using an average thickness of the outer peripheral wall which is measured by the optical microscope. In the present description, an area of a portion of the side surface of the honeycomb structure section where the electrode section is arranged is "the arrangement area of the electrode section". Moreover, a cylinder which is coaxial with the honeycomb structure section and divides the electrode section is presumed, and a dividing surface of the electrode section divided by the cylinder is a virtual dividing surface. Furthermore, an area of this virtual dividing surface is "the virtual dividing area". In the calculation of "the heat capacity of each electrode section" in the present description, a portion where the above "virtual dividing area" is 90% or more of the above "arrangement area of the electrode section" is "the electrode section". That is, in the calculation of "the heat capacity of the electrode section" in the present description, a portion where the above "virtual dividing area" is smaller than 90% of the above "arrangement area of the electrode section" is not the electrode section.

In the honeycomb structure of the present embodiment, "the total of the heat capacities of the pair of electrode sections is smaller than the heat capacity of the whole outer peripheral wall". Specifically, the total of the heat capacities of the pair of electrode sections is preferably from 2 to 80% of the heat capacity of the whole outer peripheral wall. A lower limit value of the percentage is further preferably 9%, and especially preferably 15%. Moreover, an upper limit value thereof is further preferably 75%, and especially preferably 50%. When the percentage is smaller than 2%, the effect of allowing the current to more evenly flow through the whole honeycomb structure section might not sufficiently be obtained, in a case where a voltage is applied. When the percentage is larger than 80%, an effect of decreasing the heat shock resistance deteriorates sometimes.

A thickness of the electrode section 21 is preferably from 0.025 to 3 mm, further preferably from 0.025 to 2 mm, and especially preferably from 0.1 to 1 mm. In such a range, the heat can uniformly be generated by the electrode section 21. When the thickness of the electrode section 21 is smaller than 0.025 mm, the current does not spread through the honeycomb structure section 4, so that the heat might be generated right under the electrodes in a concentrated manner. On the other hand, when the thickness is in excess of 3 mm, the electrode sections might be damaged at canning.

In the honeycomb structure 100 of the present embodiment, an electrical resistivity of the electrode section 21 may be uniform, or partially vary. When the electrical resistivity of the electrode section 21 is uniform, the electrical resistivity of the electrode section 21 is preferably from 0.01 to 100 $\Omega$cm. Furthermore, the electrical resistivity of the electrode section 21 is further preferably from 0.1 to 100 $\Omega$cm, especially preferably from 0.1 to 50 $\Omega$cm, and most preferably from 0.5 to 50 $\Omega$cm. In such a range of the electrical resistivity of the electrode section 21, each of the pair of electrode sections 21 and 21 effectively performs a function of the electrode in a piping line through which a high-temperature exhaust gas flows. When the electrical resistivity of the electrode section 21 is smaller than 0.01 $\Omega$cm, a temperature of the honeycomb structure section easily rises sometimes in the vicinities of both ends of the electrode section 21 in the cross section perpendicular to the cell extending direction. When the electrical resistivity of the electrode section 21 is larger than 100 $\Omega$cm, the current does not easily flow, and hence the electrode section does not easily perform the function of the electrode sometimes. The electrical resistivity of the electrode section is a value at 400° C.

Figure 7:
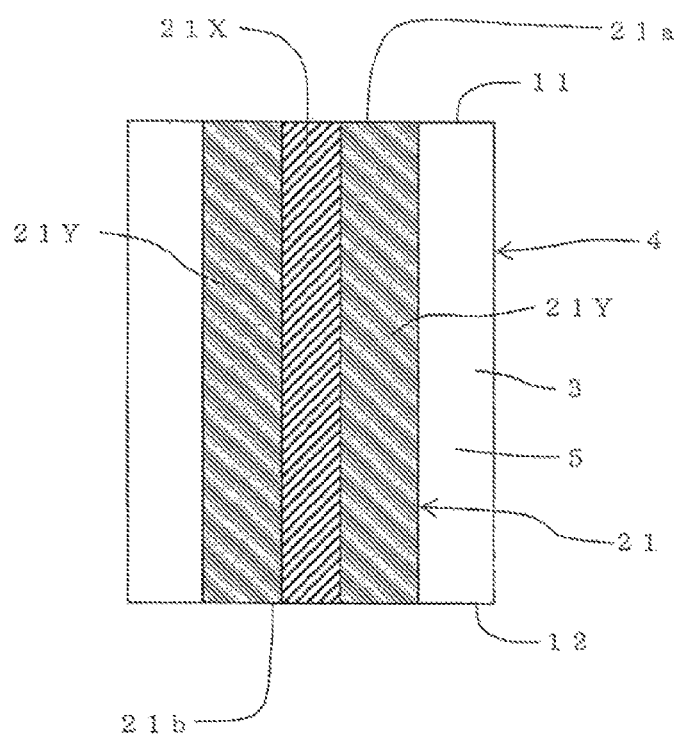
FIG. 7 is a front view schematically showing a further embodiment of the honeycomb structure of the present invention.
Figure 8:
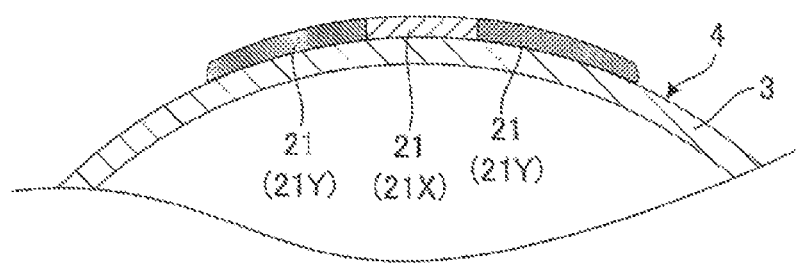
FIG. 8 is a schematic view showing a cross section perpendicular to a cell extending direction in the further embodiment of the honeycomb structure of the present invention.

When the electrical resistivity of the electrode section 21 partially varies, the electrode section 21 is preferably constituted of a center portion 21X and extended portions 21Y and 21Y as in a honeycomb structure 300 shown in FIG. 7 and FIG. 8. Moreover, an electrical resistivity of the center portion 21X of the electrode section 21 is preferably smaller than an electrical resistivity of each of the extended portions 21Y and 21Y of the electrode section 21. The center portion 21X is a portion of the electrode section 21 in the peripheral direction, in the cross section perpendicular to the cell extending direction. The extended portions 21Y and 21Y are portions positioned on both sides of the center portion 21X in the peripheral direction, in the cross section perpendicular to the extending direction of the cells 2. In consequence, when the electrical resistivity of the center portion 21X of the electrode section 21 is smaller than the electrical resistivity of the extended portion 21Y of the electrode section 21 and when the voltage is applied to the center portion 21X of the electrode section 21, the current easily flows to the center portion 21X having a low electrical resistivity. Therefore, the deviation of the flow of the current in the cell extending direction of the honeycomb structure decreases. In consequence, it is possible to effectively suppress a deviation of a temperature distribution in the cell extending direction of the honeycomb structure. FIG. 7 is a front view schematically showing this further embodiment of the honeycomb structure of the present invention. FIG. 8 is a schematic view showing a cross section perpendicular to the cell extending direction, in the further embodiment of the honeycomb structure of the present invention.

The electrical resistivity of the center portion 21X is preferably from 0.0001 to 70%, further preferably from 0.001 to 50%, and especially preferably from 0.001 to 10% of the electrical resistivity of each of the extended portions 21Y and 21Y. When the percentage is smaller than 0.0001%, the flow of the current in an outer peripheral direction decreases in the cross section perpendicular to a central axis of the honeycomb structure section, and the deviation of the temperature distribution increases sometimes. When the percentage is larger than 70%, the effect of suppressing the deviation of the temperature distribution of the honeycomb structure 300 deteriorates sometimes.

Moreover, in the honeycomb structure 100 of the present embodiment, a Young's modulus of the electrode section 21 is preferably from 2 to 50 GPa, further preferably from 3 to 45 GPa, and especially preferably from 3 to 35 GPa. In such a range of the Young's modulus of the electrode section 21, an isostatic strength of the electrode section 21 can be acquired, and cracks are not easily generated in the honeycomb structure section 4. When the Young's modulus of the electrode section 21 is smaller than 2 GPa, the isostatic strength of the electrode section 21 cannot be acquired sometimes. When the Young's modulus of the electrode section 21 is larger than 50 GPa, a rigidity enhances, and hence the cracks are easily generated in the honeycomb structure section 4 sometimes.

The Young's modulus of each electrode section is a value measured by a bending resonance method in conformity to JIS R1602. As a test piece for use in the measurement, there is used a test piece obtained by laminating a plurality of sheets made of an electrode section forming raw material which forms the electrode section, to obtain a laminated body, drying this laminated body, and then cutting the laminated body into a size of 3 mm×4 mm×40 mm.

In the honeycomb structure 100 of the present embodiment, the electrical resistivity of the electrode section 21 is preferably smaller than the electrical resistivity of the honeycomb structure section 4. Furthermore, the electrical resistivity of the electrode section 21 is further preferably 20% or less, and especially preferably from 1 to 100 of the electrical resistivity of the honeycomb structure section 4. When the electrical resistivity of the electrode section 21 is 20% or less of the electrical resistivity of the honeycomb structure section 4, the electrode section 21 more effectively functions as the electrode.

The electrode section 21 preferably contains silicon carbide particles and silicon as main components, and is further preferably made of the silicon carbide particles and silicon as raw materials, except usually contained impurities. Here, when "the silicon carbide particles and silicon are contained as the main components", it is meant that a total of masses of the silicon carbide particles and silicon is 90 mass % or more of a mass of the whole electrode section. In consequence, when the electrode section 21 contains the silicon carbide particles and silicon as the main components, the components of the electrode section 21 and components of the honeycomb structure section 4 are the same components or close components (in a case where a material of the honeycomb structure section contains a silicon-silicon carbide composite material or a silicon carbide material as a main component). Therefore, thermal expansion coefficients of the electrode section 21 and the honeycomb structure section 4 are the same value or close values. Moreover, the materials are the same, or close materials, and hence a joining strength between the electrode section 21 and the honeycomb structure section 4 increases. Therefore, even when a heat stress is applied to the honeycomb structure, the electrode section 21 can be prevented from being peeled from the honeycomb structure section 4, and a joining portion between the electrode section 21 and the honeycomb structure section 4 can be prevented from being damaged.

The porosity of the electrode section 21 is preferably from 30 to 80%, further preferably from 30 to 70%, and especially preferably from 30 to 60%. In such a range of the porosity of the electrode section 21, a suitable electrical resistivity can be obtained. When the porosity of the electrode section 21 is smaller than 30%, the electrode section is deformed sometimes at manufacturing. When the porosity of the electrode section 21 is larger than 80%, it is difficult to allow the current to evenly flow through the honeycomb structure section sometimes. Moreover, the porosity is a value measured by a mercury porosimeter.

An average pore diameter of the electrode section 21 is preferably from 5 to 45 μm, and further preferably from 7 to 40 μm. In such a range of the average pore diameter of the electrode section 21, a suitable electrical resistivity can be obtained. When the average pore diameter of the electrode section 21 is smaller than 5 μm, the electrical resistivity excessively increases sometimes. When the average pore diameter of the electrode section 21 is larger than 45 μm, the electrode section 21 has a deteriorated strength and is easily damaged sometimes. The average pore diameter is a value measured by the mercury porosimeter.

When the main components of the electrode section 21 are the silicon carbide particles and silicon, an average particle diameter of the silicon carbide particles contained in the electrode section 21 is preferably from 10 to 70 μm, and further preferably from 10 to 60 μm. In such a range of the average particle diameter of the silicon carbide particles contained in the electrode section 21, the electrical resistivity of the electrode section 21 can be controlled in a range of 0.01 to 100 Ωcm. When the average pore diameter of the silicon carbide particles contained in the electrode section 21 is smaller than 10 μm, the electrical resistivity of the electrode section 21 excessively increases sometimes. When the average pore diameter of the silicon carbide particles contained in the electrode section 21 is larger than 70 μm, the electrode section 21 has a deteriorated strength and is easily damaged sometimes. The average particle diameter of the silicon carbide particles contained in the electrode section 21 is a value measured by a laser diffraction method.

A ratio of a mass of silicon contained in the electrode section 21 to "a total of respective masses of the silicon carbide particles and silicon" contained in the electrode section 21 is preferably from 20 to 50 mass %, and further preferably from 20 to 40 mass %. In such a range of the ratio of the mass of silicon to the total of the respective masses of the silicon carbide particles and silicon contained in the electrode section 21, the electrical resistivity of the electrode section 21 can be controlled in a range of 0.01 to 100 Ωcm. When the ratio of the mass of silicon to the total of the respective masses of the silicon carbide particles and silicon contained in the electrode section 21 is smaller than 20 mass %, the electrical resistivity excessively increases sometimes. On the other hand, when the ratio is larger than 50 mass %, the electrode section is easily deformed sometimes at the manufacturing.

In the honeycomb structure 100 of the present embodiment, the electrical resistivity of the honeycomb structure section 4 is from 1 to 200 Ωcm, preferably from 1 to 100 Ωcm, and further preferably from 5 to 80 Ωcm. When the electrical resistivity is smaller than 1 Ωcm, the current excessively flows sometimes, for example, in a case where the honeycomb structure 100 is energized by the power source of a high voltage of 200 V or more (the voltage is not limited to 200 V). When the electrical resistivity is larger than 200 Ωcm, the current does not easily flow and the heat is not sufficiently generated sometimes, for example, in the case where the honeycomb structure 100 is energized by the power source of the high voltage of 200 V or more (the voltage is not limited to 200 V). The electrical resistivity of the honeycomb structure section is a value measured by a four-terminal method. The electrical resistivity of the honeycomb structure section is a value at 400° C.

In the honeycomb structure 100 of the present embodiment, a shape of the cells 2 in the cross section perpendicular to the extending direction of the cells 2 is a quadrangular shape or a hexagonal shape, preferably the hexagonal shape, and further preferably a regular hexagonal shape. The honeycomb structure 100 shown in FIG. 2 is an example where the shape of the cells 2 in the cross section perpendicular to the extending direction of the cells 2 is the hexagonal shape, and all the cells 2 are formed into the same shape (the hexagonal shape) and are arranged in the same direction. Moreover, a honeycomb structure 103 shown in FIG. 6 is an example where the shape of the cells 2 in the cross section perpendicular to the extending direction of the cells 2 is the quadrangular shape, and all the cells 2 are formed into the same shape (the quadrangular shape) and are arranged in the same direction. FIG. 6 is a schematic view showing the cross section perpendicular to the cell extending direction in the further embodiment of the honeycomb structure of the present invention.

In the honeycomb structure 100 of the present embodiment, a material of the partition walls 1 and the outer peripheral wall 3 preferably contains a silicon-silicon carbide composite material or a silicon carbide material as a main component, and the material is further preferably the silicon-silicon carbide composite material or the silicon carbide material. When "the material of the partition walls 1 and the outer peripheral wall 3 contains the silicon-silicon carbide composite material or the silicon carbide material as the main component", it is meant that the partition walls 1 and the outer peripheral wall 3 contain 90 mass or more of the silicon-silicon carbide composite material or the silicon carbide material in the whole material. By the use of such a material, the electrical resistivity of the honeycomb structure section can be from 1 to 200 Ωcm. Here, the silicon-silicon carbide composite material contains silicon carbide particles as aggregates, and silicon as a binding agent to bind the silicon carbide particles, and the plurality of silicon carbide particles are preferably bound by silicon so as to form pores among the silicon carbide particles. Moreover, the silicon carbide material is obtained by sintering silicon carbide. The electrical resistivity of the honeycomb structure section is a value at 400° C.

In the honeycomb structure 100 of the present embodiment, an average particle diameter of the silicon carbide particles (aggregates) constituting the honeycomb structure section 4 is preferably from 3 to 50 µm, and further preferably from 3 to 40 µm. In such a range of the average particle diameter of the silicon carbide particles constituting the honeycomb structure section 4, the electrical resistivity of the honeycomb structure section 4 at 400° C. can be from 1 to 200 Ωcm. When the average particle diameter of the silicon carbide particles is smaller than 3 µm, the electrical resistivity of the honeycomb structure section 4 increases sometimes. When the average particle diameter of the silicon carbide particles is larger than 50 µm, the electrical resistivity of the honeycomb structure section 4 decreases sometimes. Furthermore, when the average particle diameter of the silicon carbide particles is larger than 50 µm, an extrusion forming die is clogged with a forming raw material sometimes at the extrusion forming of a formed honeycomb body. The average particle diameter of the silicon carbide particles is a value measured by the laser diffraction method.

In the honeycomb structure 100 of the present embodiment, when the material of the honeycomb structure section 4 is the silicon-silicon carbide composite material, the following conditions are preferably satisfied. A ratio of the above "mass of silicon as the binding agent" to the total of "the mass of the silicon carbide particles as the aggregates" contained in the honeycomb structure section 4 and "the mass of silicon as the binding agent" contained in the honeycomb structure section 4 is preferably from 10 to 40 mass %. The above ratio is further preferably from 15 to 35 mass %. When the ratio is smaller than 10 mass %, the strength of the honeycomb structure deteriorates sometimes. When the ratio is larger than 40 mass %, the shape cannot be held at firing.

In the honeycomb structure 100 of the present embodiment, a partition wall thickness is from 50 to 260 µm, and preferably from 70 to 180 µm. In such a range of the partition wall thickness, when the honeycomb structure 100 is used as a catalyst carrier and a catalyst is loaded onto the honeycomb structure, a pressure loss at the flowing of the exhaust gas can be prevented from being excessively increased. When the partition wall thickness is smaller than 50 µm, the strength of the honeycomb structure deteriorates sometimes. When the partition wall thickness is larger than 260 µm, the pressure loss at the flowing of the exhaust gas increases sometimes in the case where the honeycomb structure 100 is used as the catalyst carrier and the catalyst is loaded onto the honeycomb structure.

In the honeycomb structure 100 of the present embodiment, a cell density is preferably from 40 to 150 cells/cm$^2$, and further preferably from 70 to 100 cells/cm$^2$. In such a range of the cell density, a purification performance of the catalyst can be enhanced in a state where the pressure loss at the flowing of the exhaust gas is decreased. When the cell density is smaller than 40 cells/cm$^2$, a catalyst loading area decreases sometimes. When the cell density is larger than 150 cells/cm$^2$, the pressure loss at the flowing of the exhaust gas increases sometimes, in the case where the honeycomb structure 100 is used as the catalyst carrier and the catalyst is loaded onto the honeycomb structure.

A porosity of the partition walls 1 of the honeycomb structure section 4 is preferably from 30 to 60%, and further preferably from 30 to 55%. When the porosity is smaller than 30%, the deformation at the firing enlarges sometimes. When the porosity is in excess of 60%, the strength of the honeycomb structure deteriorates sometimes. The porosity is a value measured by the mercury porosimeter.

An average pore diameter of the partition walls 1 of the honeycomb structure section 4 is preferably from 2 to 15 μm, and further preferably from 4 to 8 μm. When the average pore diameter is smaller than 2 μm, the electrical resistivity excessively increases sometimes. When the average pore diameter is larger than 15 μm, the electrical resistivity excessively decreases sometimes. The average pore diameter is a value measured by the mercury porosimeter.

There is not any special restriction on a shape of the honeycomb structure 100 of the present embodiment, and examples of the shape include a tubular shape with a round bottom surface (a cylindrical shape), a tubular shape with an oval bottom surface, and a tubular shape including a bottom surface having a polygonal shape (a quadrangular shape, a pentangular shape, a hexagonal shape, a heptagonal shape, an octagonal shape, or the like). Moreover, as to a size of the honeycomb structure, an area of the bottom surface is preferably from 2000 to 20000 mm$^2$, and further preferably from 4000 to 10000 mm$^2$. Furthermore, a length of the honeycomb structure in a central axis direction is preferably from 50 to 200 mm, and further preferably from 75 to 150 mm.

A thickness of the outer peripheral wall 3 constituting the outermost periphery of the honeycomb structure section 4 is preferably from 0.1 to 1 mm, further preferably from 0.2 to 0.8 mm, and especially preferably from 0.2 to 0.5 mm. When the thickness of the outer peripheral wall is smaller than 0.1 mm, the strength of the honeycomb structure 100 (the honeycomb structure section 4) deteriorates sometimes. When the thickness is larger than 1 mm, an area of each partition wall onto which the catalyst is loaded decreases sometimes.

Figure 9:
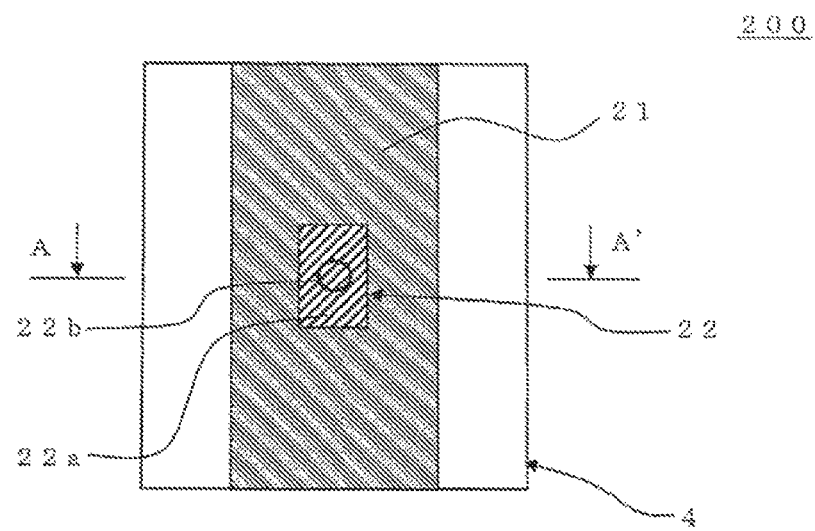
FIG. 9 is a front view schematically showing a still further embodiment of the honeycomb structure of the present invention.
Figure 10:
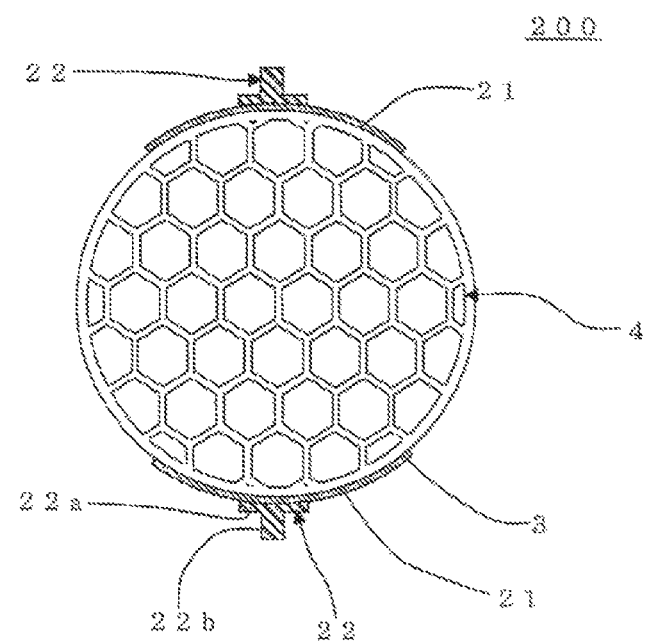
FIG. 10 is a schematic view showing a cross section cut along the A-A' line of FIG. 9.
Figure 11:
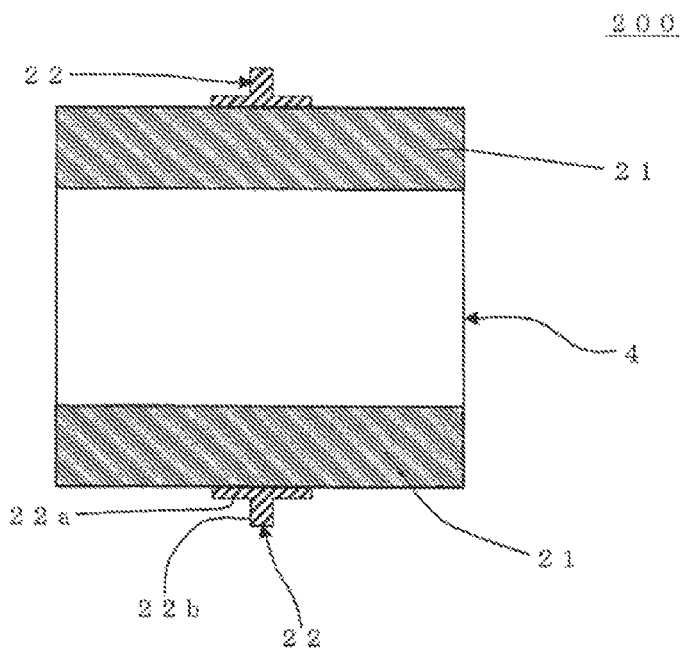
FIG. 11 is a side view schematically showing the still further embodiment of the honeycomb structure of the present invention.

Next, another embodiment of the honeycomb structure of the present invention will be described. As shown in FIG. 9 to FIG. 11, in a honeycomb structure 200 of the present embodiment, electrode terminal projecting portions 22 to be connected to electric wires are arranged in the honeycomb structure 100 (see FIG. 1 and FIG. 2) of the present invention. The electrode terminal projecting portions 22 are arranged in center portions of respective electrode sections 21 and 21 in a cross section perpendicular to a cell extending direction, and center portions of the respective electrode sections in the cell extending direction. The electrode terminal projecting portions 22 are portions to be connected to the wires from a power source so that a voltage is applied between the electrode sections 21 and 21.

In this manner, the electrode terminal projecting portions 22 are arranged, and hence when the voltage is applied between the electrode sections, a deviation of a temperature distribution of a honeycomb structure section can further be decreased. FIG. 9 is a front view schematically showing this further embodiment of the honeycomb structure of the present invention. FIG. 10 is a schematic view showing a cross section cut along the A-A' line of FIG. 9. FIG. 11 is a side view schematically showing the further embodiment of the honeycomb structure of the present invention.

Respective conditions of the honeycomb structure 200 of the present embodiment are preferably the same conditions as in the one embodiment of the honeycomb structure of the present invention (the honeycomb structure 100), except the following condition (Z). In the condition (Z), "the electrode terminal projecting portions 22 to be connected to the electric wires are arranged in the center portions of the respective electrode sections 21 and 21 in the cross section perpendicular to the extending direction of cells 2, and the center portions of the electrode sections in the extending direction of the cells 2".

When main components of the electrode sections 21 are silicon carbide particles and silicon, main components of the electrode terminal projecting portions 22 are preferably also the silicon carbide particles and silicon. In this way, the electrode terminal projecting portions 22 contain the silicon carbide particles and silicon as the main components, and hence the components of the electrode sections 21 are the same as (or close to) the components of the electrode terminal projecting portions 22. Therefore, thermal expansion coefficients of the electrode section 21 and the electrode terminal projecting portion 22 are the same value or close values. Moreover, materials are the same or close materials, and hence a joining strength between the electrode section 21 and the electrode terminal projecting portion 22 increases. In consequence, even when a heat stress is applied to the honeycomb structure, the electrode terminal projecting portions 22 can be prevented from being peeled from the electrode sections 21, and a joining portion between the electrode terminal projecting portion 22 and the electrode section 21 can be prevented from being damaged. Here, when "the electrode terminal projecting portions 22 contain the silicon carbide particles and silicon as the main components", it is meant that the electrode terminal projecting portions 22 contain 90 mass % or more of the silicon carbide particles and silicon in the whole material.

There is not any special restriction on a shape of the electrode terminal projecting portions 22, and the shape may be any shape that can be joined to the electrode sections 21 and the electric wires. For example, as shown in FIG. 9 to FIG. 11, the electrode terminal projecting portion 22 preferably has a shape obtained by disposing a columnar projection 22b on a quadrangular plate-like base 22a. According to such a shape, the electrode terminal projecting portion 22 can firmly be joined to the electrode section 21 by the base 22a, and the electric wire can securely be joined to the electrode terminal projecting portion by the projection 22b.

In the electrode terminal projecting portion 22, a thickness of the base 22a is preferably from 1 to 5 mm. The electrode terminal projecting portion 22 having such a thickness can securely be joined to the electrode section 21. When the thickness is smaller than 1 mm, the base 22a weakens, and the projection 22b is easily removed from the base 22a sometimes. When the thickness is larger than 5 mm, a space where the honeycomb structure is disposed enlarges more than necessary sometimes.

In the electrode terminal projecting portion 22, a length (a width) of the base 22a is preferably from 10 to 50%, and further preferably from 20 to 40% of a length of the electrode section 21. In such a range, the electrode terminal projecting portion 22 is not easily removed from the electrode section 21. When the percentage is smaller than 10%, the electrode terminal projecting portion 22 is easily removed from the electrode section 21 sometimes. When the percentage is larger than 50%, a mass increases sometimes. "The length (width) of the base 22a" is a length of the base in "an outer peripheral direction in a cross section of a honeycomb structure section 4 which is perpendicular to the cell extending direction". "The length of the electrode section 21" is a length of the electrode section "in the outer peripheral direction in the cross section of the honeycomb structure section 4 which is perpendicular to the cell extending direction (the direction along the outer periphery)". In the electrode terminal projecting portion 22, the length of the base 22a in "the extending direction of the cells 2" is preferably from 5 to 30% of a length of the honeycomb structure section 4 in the cell extending direction. In such a range of the length of the base 22a in "the extending direction of the cells 2", a sufficient joining strength can be obtained. When the length of the base 22a in "the extending direction of the cells 2" is shorter than 5% of the length of the honeycomb structure section 4 in the cell extending direction, the base is easily removed from the electrode section 21 sometimes. Moreover, when percentage is larger than 30%, the mass increases sometimes.

In the electrode terminal projecting portion 22, a thickness of the projection 22b is preferably from 3 to 15 mm. The electric wire can securely be joined to the projection 22b having such a thickness. When the thickness is smaller than 3 mm, the projection 22b is easily broken sometimes. When the thickness is larger than 15 mm, the electric wire is not easily connected sometimes. Moreover, a length of the projection 22b is preferably from 3 to 20 mm. The electric wire can securely be joined to the projection 22b having such a length. When the length is shorter than 3 mm, the electric wire is not easily joined sometimes. When the length is longer than 20 mm, the projection 22b is easily broken sometimes.

An electrical resistivity of the electrode terminal projecting portion 22 is preferably from 0.1 to 2.0 Ωcm, and further preferably from 0.1 to 1.0 Ωcm. In such a range of the electrical resistivity of the electrode terminal projecting portion 22, a current can efficiently be supplied from the electrode terminal projecting portion 22 to the electrode section 21 in a piping line through which a high-temperature exhaust gas flows. When the electrical resistivity of the electrode terminal projecting portion 22 is larger than 2.0 Ωcm, the current does not easily flow, and hence the current is not easily supplied to the electrode section 21 sometimes.

A porosity of the electrode terminal projecting portion 22 is preferably from 30 to 45%, and further preferably from 30 to 40%. In such a range of the porosity of the electrode terminal projecting portion 22, a suitable electrical resistivity can be obtained. When the porosity of the electrode terminal projecting portion 22 is higher than 45%, a strength of the electrode terminal projecting portion 22 deteriorates sometimes, and especially when the strength of the projection 22b deteriorates, the projection 22b is easily broken sometimes. The porosity is a value measured by a mercury porosimeter.

An average pore diameter of the electrode terminal projecting portion 22 is preferably from 5 to 20 μm, and further preferably from 7 to 15 μm. In such a range of the average pore diameter of the electrode terminal projecting portion 22, a suitable electrical resistivity can be obtained. When the average pore diameter of the electrode terminal projecting portion 22 is larger than 20 μm, the strength of the electrode terminal projecting portion 22 deteriorates sometimes, and especially when the strength of the projection 22b deteriorates, the projection 22b is easily broken sometimes. The average pore diameter is a value measured by the mercury porosimeter.

When main components of the electrode terminal projecting portions 22 are silicon carbide particles and silicon, an average particle diameter of the silicon carbide particles contained in the electrode terminal projecting portions 22 is preferably from 10 to 60 μm, and further preferably from 20 to 60 μm. In such a range of the average particle diameter of the silicon carbide particles contained in the electrode terminal projecting portions 22, the electrical resistivity of the electrode terminal projecting portions 22 can be from 0.1 to 2.0 Ωcm. When an average pore diameter of the silicon carbide particles contained in the electrode terminal projecting portions 22 is smaller than 10 μm, the electrical resistivity of the electrode terminal projecting portion 22 excessively increases sometimes. When the average pore diameter of the silicon carbide particles contained in the electrode terminal projecting portions 22 is larger than 60 μm, the electrical resistivity of the electrode terminal projecting portion 22 excessively decreases sometimes. The average particle diameter of the silicon carbide particles contained in the electrode terminal projecting portions 22 is a value measured by a laser diffraction method.

A ratio of a mass of silicon contained in the electrode terminal projecting portions 22 to "a total of respective masses of the silicon carbide particles and silicon" contained in the electrode terminal projecting portions 22 is preferably from 20 to 40 mass %, and further preferably from 25 to 35 mass %. In such a range of the ratio of the mass of silicon to the total of the respective masses of the silicon carbide particles and silicon contained in the electrode terminal projecting portions 22, the electrical resistivity of 0.1 to 2.0 Ωcm can easily be obtained. When the ratio of the mass of silicon to the total of the respective masses of the silicon carbide particles and silicon contained in the electrode terminal projecting portions 22 is smaller than 20 mass %, the electrical resistivity excessively increases sometimes. Moreover, when the ratio is larger than 40 mass %, the electrode terminal projecting portions are deformed sometimes at manufacturing.

Figure 12:
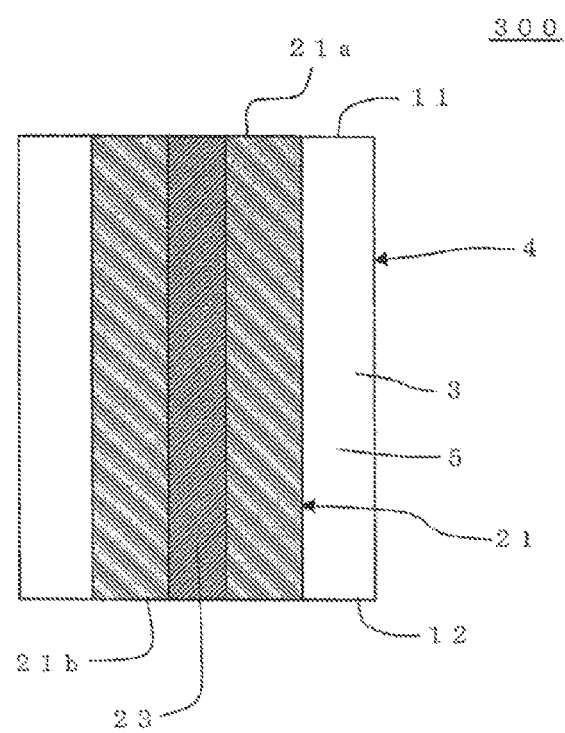
FIG. 12 is a front view schematically showing the further embodiment of the honeycomb structure of the present invention.

Next, a still further embodiment of the honeycomb structure of the present invention will be described. The honeycomb structure 300 of the present embodiment has a constitution in which a conductor 23 is disposed on the surface of an electrode section 21 in the above-mentioned one embodiment (the honeycomb structure 100) of the honeycomb structure of the present invention shown in FIG. 1 and FIG. 2. In the honeycomb structure 300 of the present embodiment, the conductor 23 has an electrical resistivity lower than that of the electrode section 21. Therefore, the honeycomb structure 300 of the present embodiment preferably has the same conditions as those of the honeycomb structure 100 of the above present invention (see FIG. 1 and FIG. 2), except that the honeycomb structure has the conductor 23. FIG. 12 is a front view schematically showing this still further embodiment of the honeycomb structure of the present invention.

As described above, in the honeycomb structure 300 of the present embodiment, the conductor 23 having the electrical resistivity lower than that of the electrode section 21 is disposed on the surface of the electrode section 21. Therefore, a voltage is applied to the conductor 23, thereby making it possible to allow a current to more evenly flow through the whole honeycomb structure section.

There is not any special restriction on a shape of the conductor 23, but as shown in FIG. 12, the shape is preferably a rectangular shape extending from one end 21a of the electrode section to the other end 21b of the electrode section. The conductor 23 does not have to be disposed along a region between both the ends of the electrode section (a space may be made between an end of the conductor 23 and the end of the electrode section). A length of the conductor 23 (the length in an extending direction of "cells of a honeycomb structure section") is preferably 50% or more, further preferably 80% or more, and especially preferably 100% of a length of the electrode section 21 (the length in the extending direction of "the cells of the honeycomb structure section"). When the percentage is smaller than 50%, the effect of allowing the current to more evenly flow through the whole honeycomb structure section deteriorates sometimes, in a case where the voltage is applied.

Moreover, there is not any special restriction on a length of the conductor 23 in a peripheral direction (the peripheral direction in an outer periphery of the honeycomb structure section), as long as the length is not more than a length of the electrode section in the peripheral direction. The length of the conductor 23 in the peripheral direction is preferably from 5 to 75%, and further preferably from 10 to 60% of the length of the electrode section in the peripheral direction. When the percentage is larger than 75%, a temperature of the honeycomb structure section easily rises in the vicinities of both ends of the electrode section 21 sometimes, in a cross section perpendicular to the cell extending direction. When the percentage is smaller than 5%, the effect of allowing the current to more evenly flow through the whole honeycomb structure section deteriorates sometimes, in the case where the voltage is applied.

An example of a material of the conductors 23 is a material formed by impregnating a silicon carbide structure body with silicon so as to achieve a porosity of 5% or less.

Moreover, a thickness of the conductor 23 is preferably from 0.1 to 2 mm, further preferably from 0.2 to 1.5 mm, and especially preferably from 0.3 to 1 mm. When the thickness is larger than 2 mm, a heat shock resistance of the honeycomb structure deteriorates sometimes. When the thickness is smaller than 0.1 mm, a strength of the conductor 23 deteriorates sometimes.

It is to be noted that the honeycomb structure of the present invention can be used as a catalyst carrier. The honeycomb structure of the present invention, onto which a known catalyst is loaded by a known method, can be used as a catalyst body for treatment of an exhaust gas.

[2] Manufacturing Method of Honeycomb Structure:

Next, a manufacturing method of the honeycomb structure of the present invention will be described. There will be described a method of manufacturing the honeycomb structure 200 (see FIG. 9 to FIG. 11) which is the above further embodiment of the honeycomb structure of the present invention (hereinafter referred to as "a manufacturing method (A)" sometimes).

[2-1] Preparation of Formed Honeycomb Body:

First, metal silicon powder (metal silicon), a binder, a surfactant, a pore former, water and the like are added to silicon carbide powder (silicon carbide) to prepare a forming raw material. A mass of metal silicon is preferably from 10 to 40 mass % of a total of a mass of the silicon carbide powder and the mass of metal silicon. An average particle diameter of silicon carbide particles in the silicon carbide powder is preferably from 3 to 50 µm, and further preferably from 5 to 20 µm. An average particle diameter of metal silicon (the metal silicon powder) is preferably from 2 to 35 µm. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder. It is to be noted that this is a blend of the forming raw material when the material of the honeycomb structure section is a silicon-silicon carbide composite material. When the material of the honeycomb structure section is a silicon carbide material, metal silicon is not added.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total of masses of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as pores are formed after the firing, and examples of the pore former include graphite, starch, resin balloon, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, a die is clogged sometimes at formation. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method in which a kneader, a vacuum clay kneader or the like is used.

Next, the kneaded material is extruded to obtain a formed honeycomb body. In the extrusion forming, a die having a desirable whole shape, cell shape, partition wall thickness, cell density and the like is preferably used. A material of the die is preferably a hard metal which does not easily wear down. The formed honeycomb body is a structure having partition walls with which a plurality of cells are formed to become through channels of a fluid, and an outer peripheral wall positioned in the outermost periphery.

The partition wall thickness, cell density, outer peripheral wall thickness and the like of the formed honeycomb body can suitably be determined in accordance with a constitution of the honeycomb structure of the present invention which is to be prepared, in consideration of shrinkages at drying and firing.

The obtained formed honeycomb body is preferably dried. There is not any special restriction on a drying method. Examples of the method include electromagnetic heating systems such as microwave heating drying and high-frequency dielectric heating drying, and external heating systems such as hot air drying and superheat vapor drying. In these examples, it is preferable that a predetermined amount of water content is dried by the electromagnetic heating system, and then the remaining water content is dried by the external heating system, because the whole formed body can rapidly and evenly be dried without generating any cracks. As drying conditions, it is preferable that the water content of 30 to 99 mass % of an amount of the water content prior to the drying is removed by the electromagnetic heating system, and then the water content is decreased down to 3 mass % or less by the external heating system. The electromagnetic heating system is preferably the dielectric heating drying, and the external heating system is preferably the hot air drying.

When the length of the formed honeycomb body in the central axis direction is not a desirable length, both end surfaces (both ends) of the formed honeycomb body are preferably cut so as to achieve the desirable length. There is not any special restriction on a cutting method, but an example of the cutting method is a method using a disc saw cutter or the like.

[2-2] Preparation of Electrode Section Forming Raw Material:

Next, an electrode section forming raw material to form the electrode sections is prepared. When the main components of the electrode sections are silicon carbide and silicon, the electrode section forming raw material is preferably preparing by adding predetermined additives to silicon carbide powder and silicon powder, followed by the kneading. It is to be noted that when the electrode sections each constituted of the center portion and the extended portions are formed, a center portion forming raw material and an extended portion forming raw material are prepared, respectively. When main components of the center portion are silicon carbide and silicon, the center portion forming raw material is preferably formed by adding predetermined additives to silicon carbide powder and silicon powder, followed by the kneading. When main components of the extended portions are silicon carbide and silicon, the extended portion forming raw material is preferably formed by adding predetermined additives to silicon carbide powder and silicon powder, followed by the kneading.

Specifically, metal silicon powder (metal silicon), a binder, a surfactant, a pore former, water and the like are added to the silicon carbide powder (silicon carbide), and kneaded to prepare the electrode section forming raw material. A mass of metal silicon is preferably from 20 to 40 parts by mass, when a total mass of the silicon carbide powder and metal silicon is 100 parts by mass. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon (metal silicon particles) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloon, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode section forming raw material. There is not any special restriction on a kneading method, and, for example, a vertical stirrer can be used.

Next, the obtained electrode section forming raw material is preferably applied to the side surface of the dried formed honeycomb body. There is not any special restriction on a method of applying the electrode section forming raw material to the side surface of the formed honeycomb body, but, for example, a printing method can be used.

The electrode section forming raw material is preferably applied to the side surface of the formed honeycomb body so as to achieve the arrangement of the electrode sections in the above honeycomb structure of the present invention. Specifically, in the cross section perpendicular to the extending direction of the cells 2 and including the electrode sections 21, a straight line parallel to the diagonal line 13 connecting two facing vertexes of the one cell 2 and passing the center O of the honeycomb structure section 4 is the reference line L. At this time, the electrode section forming raw material is applied to the side surface of the formed honeycomb body so that the respective electrode sections 21 and 21 are arranged at positions to intersect with the at least one reference line L as in the honeycomb structure 100 shown in FIG. 1 and FIG. 2. It is to be noted that when the electrode sections each constituted of the center portion and the extended portions are formed, each of the center portion forming raw material and the extended portion forming raw material is preferably applied to the side surface of the dried formed honeycomb body so as to satisfy the above conditions. Additionally, each raw material is applied to the side surface of the formed honeycomb body so as to obtain the shapes of the center portion 21X and extended portions 21Y of the electrode section 21 as shown in FIG. 7 and FIG. 8. There is not any special restriction on a method of applying the center portion forming raw material and the extended portion forming raw material to the side surface of the formed honeycomb body, and similarly to the case where the electrode section forming raw material is applied, for example, the printing method can be used.

A thickness of each of the electrode sections can be set to a desirable thickness, by regulating the thickness of the electrode section forming raw material at the application of the material. In consequence, the electrode sections can be formed simply by applying the electrode section forming raw material to the side surface of the formed honeycomb body, and carrying out the drying and firing, so that the electrode sections can very easily be formed.

Next, the electrode section forming raw material applied to the side surface of the formed honeycomb body is preferably dried. In consequence, it is possible to obtain "the dried "formed honeycomb body to which the electrode section forming raw material is applied (any electrode terminal projecting portion forming members are not attached)"". A drying condition is preferably from 50 to 100° C.

[2-3] Preparation of Electrode Terminal Projecting Portion Forming Member:

Next, the electrode terminal projecting portion forming members are preferably prepared. The electrode terminal projecting portion forming members are attached to the formed honeycomb body, to form the electrode terminal projecting portions. There is not any special restriction on a shape of the electrode terminal projecting portion forming members, but a shape shown in, for example, FIG. 9 to FIG. 11 is preferably formed. Moreover, the obtained electrode terminal projecting portion forming members are preferably attached to a portion to which the electrode section forming raw material is applied, in the formed honeycomb body to which the electrode section forming raw material is applied. It is to be noted that an order of the preparation of the formed honeycomb body, the preparation of the electrode section forming raw material and the preparation of the electrode terminal projecting portion forming members may be any order.

The electrode terminal projecting portion forming members are preferably obtained by forming and drying an electrode terminal projecting portion forming raw material (the raw material to form the electrode terminal projecting portion forming members). When the main components of the electrode terminal projecting portions are silicon carbide and silicon, the electrode terminal projecting portion forming raw material is preferably formed by adding predetermined additives to silicon carbide powder and silicon powder and kneading this material.

Specifically, metal silicon powder (metal silicon), a binder, a surfactant, a pore former, water and the like are added to the silicon carbide powder (silicon carbide), and kneaded to prepare the electrode terminal projecting portion forming raw material. A mass of metal silicon is preferably from 20 to 40 mass % of a total of a mass of the silicon carbide powder and the mass of metal silicon. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon particles (metal silicon) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 40 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloon, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the electrode terminal projecting portion forming raw material. There is not any special restriction on a kneading method, and, for example, a kneader can be used.

There is not any special restriction on a method of forming the obtained electrode terminal projecting portion forming raw material, to obtain a shape of the electrode terminal projecting portion forming members, and an example of the method is a method of carrying out processing after extrusion forming.

It is preferable that the electrode terminal projecting portion forming raw material is formed into the shape of the electrode terminal projecting portion forming members, and then dried to obtain the electrode terminal projecting portion forming members. A drying condition is preferably from 50 to 100° C.

Next, the electrode terminal projecting portion forming members are preferably attached to the formed honeycomb body to which the electrode section forming raw material is applied. There is not any special restriction on a method of attaching the electrode terminal projecting portion forming members to the formed honeycomb body (the portions of the formed honeycomb body to which the electrode section forming raw material is applied). The electrode terminal projecting portion forming members are preferably attached to the formed honeycomb body by use of the above electrode section forming raw material. For example, the electrode section forming raw material is applied to "the surfaces" of the electrode terminal projecting portion forming members "which are attached to the formed honeycomb body (the surfaces which come in contact with the formed honeycomb body)", and then the electrode terminal projecting portion forming members are preferably attached to the formed honeycomb body so that "the surface to which the electrode section forming raw material is applied" comes in contact with the formed honeycomb body.

Then, "the formed honeycomb body to which the electrode section forming raw material is applied and the electrode terminal projecting portion forming members are attached" is preferably dried and fired, to obtain the honeycomb structure of the present invention. It is to be noted that when the one embodiment (the honeycomb structure 100, see FIG. 1 and FIG. 2) of the honeycomb structure of the present invention is prepared, the above dried "formed honeycomb body to which the electrode section forming raw material is applied (any electrode terminal projecting portion forming members are not attached)" may be fired.

A drying condition at this time is preferably from 50 to 100° C.

Moreover, prior to the firing, calcination is preferably performed to remove the binder and the like. The calcination is preferably performed at 400 to 500° C. in the atmospheric air for 0.5 to 20 hours. There is not any special restriction on a calcinating and firing method, and the firing can be performed using an electric furnace, a gas furnace or the like. As firing conditions, heating is preferably performed at 1400 to 1500° C. in an inert atmosphere of nitrogen, argon or the like for one to 20 hours. Moreover, after the firing, an oxygenation treatment is preferably performed at 1200 to 1350° C. for one to ten hours, to enhance a durability.

It is to be noted that the electrode terminal projecting portion forming members may be attached before or after firing the formed honeycomb body. When the electrode terminal projecting portion forming members are attached to the formed honeycomb body which has been fired, the fired formed honeycomb body is preferably then fired again on the above conditions.

Next, a manufacturing method of the honeycomb structure 300 shown in FIG. 12 will be described. According to the manufacturing method of the honeycomb structure 300, in the above manufacturing method (A), "the dried formed honeycomb body" is prepared, and then any electrode terminal projecting portion forming members are not attached, but the conductors 23 are arranged.

Examples of a method of disposing each of the conductors 23 in "the dried formed honeycomb body" include a method of attaching a thin metal plate (a metal foil) to the surface of the electrode section, and a method of applying a paste containing metal powder to the surface of the electrode section and drying the paste. It is to be noted that the above "dried formed honeycomb body" is the dried "formed honeycomb body to which the electrode section forming raw material is applied (any electrode terminal projecting portion forming members are not attached)".

EXAMPLES

Hereinafter, examples of the present invention will specifically be described, but the present invention is not limited to these examples.

Example 1

Silicon carbide (SiC) powder and metal silicon (Si) powder were mixed at a mass ratio of 80:20. To this mixture, hydroxypropyl methylcellulose as a binder and a water-absorbing resin as a pore former were added, and water was added, to prepare a forming raw material, and the forming raw material was kneaded by a vacuum clay kneader, to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Moreover, an average particle diameter of the pore former was 20 µm. The average particle diameters of silicon carbide, metal silicon and the pore former were values measured by a laser diffraction method.

The obtained columnar kneaded material was formed using an extrusion forming machine. In this manner, there was obtained a formed honeycomb body in which a plurality of cells extending from one end surface to the other end surface were formed to become through channels of a fluid, and in a cross section perpendicular to a cell extending direction, a cell shape was a hexagonal shape. The obtained formed honeycomb body was subjected to high-frequency dielectric heating drying, and then dried at 120° C. for two hours by use of a hot air drier, and both end surfaces of the formed honeycomb body were cut as much as predetermined amounts.

Next, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added, and mixed. This mixture was kneaded to prepare an electrode section forming raw material. A content of the binder was 0.5 part by mass, when a total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 µm, and an average particle diameter of the metal silicon powder was 6 µm. The average particle diameters of silicon carbide and metal silicon were values measured by the laser diffraction method. The kneading was carried out by a vertical stirrer.

Next, the electrode section forming raw material was applied, in a band-like state, to the side surface of the dried formed honeycomb body so as to satisfy the following conditions. Specifically, the electrode section forming raw material was applied to the above side surface so that a thickness (the thickness after the drying and the firing) was 0.25 mm, "the number of points where a reference line overlapped with each electrode section" was two, "0.5 times a center angle in a cross section perpendicular to a cell extending direction" was 35°, and an angle β was 180°. The electrode section forming raw material was applied to two portions of the side surface of the dried formed honeycomb body. Then, in the cross section perpendicular to the cell extending direction, one of the two portions to which the electrode section forming raw material was applied was disposed on an opposite side to the other portion via the center of the formed honeycomb body. A shape of the electrode section forming raw material applied to the side surface of the formed honeycomb body was a rectangular shape.

Next, the electrode section forming raw material applied to the formed honeycomb body was dried. A drying condition was 70° C.

Next, silicon carbide (SiC) powder and metal silicon (Si) powder were mixed at a mass ratio of 60:40. To this mixture, hydroxypropyl methylcellulose as a binder was added, and water was also added, and mixed. This mixture was kneaded to prepare an electrode terminal projecting portion forming raw material. The electrode terminal projecting portion forming raw material was kneaded using a vacuum clay kneader, to prepare a kneaded material. A content of the binder was 4 parts by mass, when a total of the silicon carbide (SiC) powder and the metal silicon (Si) powder was 100 parts by mass. A content of the water was 22 parts by mass, when the total of the silicon carbide (SiC) powder and the metal silicon (Si)

powder was 100 parts by mass. An average particle diameter of the silicon carbide powder was 52 μm, and an average particle diameter of the metal silicon powder was 6 μm. The average particle diameters of silicon carbide and metal silicon were values measured by the laser diffraction method.

The obtained kneaded material was processed into a shape (the shape constituted of a base and a projection) as in an electrode terminal projecting portion 22 shown in FIG. 9 to FIG. 11, and was dried, to obtain electrode terminal projecting portion forming members. Moreover, a drying condition was 70° C. A portion corresponding to a plate-like base 22a had a size of "3 mm×12 mm×15 mm". Moreover, a portion corresponding to a projection 22b was a columnar portion having a bottom surface diameter of 7 mm and a length of 10 mm in a central axis direction. Two electrode terminal projecting portion forming members were prepared.

Next, the two electrode terminal projecting portion forming members were attached to two portions of the formed honeycomb body to which the electrode section forming raw material was applied, respectively. The electrode terminal projecting portion forming members were attached to the portions of the formed honeycomb body to which the electrode section forming raw material was applied, by use of the electrode section forming raw material. Afterward, "the formed honeycomb body to which the electrode section forming raw material was applied and the electrode terminal projecting portion forming members were attached" was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

An average pore diameter (a pore size) of partition walls of the obtained honeycomb structure was 8.6 μm, and a porosity was 45%. The average pore diameter and the porosity were values measured by a mercury porosimeter. Furthermore, a thickness of each of the partition walls of the honeycomb structure was 101.6 μm, and a cell density was 93 cells/cm². Moreover, a bottom surface of the honeycomb structure had a round shape of a diameter of 93 mm, and a length of the honeycomb structure in the cell extending direction was 100 mm. Furthermore, the number of the points where the reference line overlapped with each electrode section was two. Additionally, an angle of 0.5 times the center angle in the cross section of each of two electrode sections of the honeycomb structure which was perpendicular to the cell extending direction was 35°. Moreover, a thickness of the electrode section was 0.25 mm. Furthermore, the angle β was 180°. Additionally, an electrical resistivity of the electrode section was 2.8 Ωcm, an electrical resistivity of the honeycomb structure section was 40 Ωcm, and an electrical resistivity of an electrode terminal projecting portion was 0.8 Ωcm. Moreover, the electrode section was formed along a region from one end surface to the other end surface of a honeycomb structure section.

Additionally, the electrical resistivities of the honeycomb structure section, each of the electrode sections and each of the electrode terminal projecting portions were measured by the following method. Each test piece of 10 mm×10 mm×50 mm was prepared using the same material as that of an object to be measured. Specifically, when the electrical resistivity of the honeycomb structure section was measured, the test piece was prepared using the same material as that of the honeycomb structure section. When the electrical resistivity of the electrode section was measured, the test piece was prepared using the same material as that of the electrode section. Moreover, when the electrical resistivity of the electrode terminal projecting portion was measured, the test piece was prepared using the same material as that of the electrode terminal projecting portion. Afterward, all surfaces of both ends of each of the test pieces were coated with a silver paste, and provided with a wiring line, thereby enabling energization. A voltage applying current measuring device was connected to the test piece, to apply a voltage thereto. A thermocouple was disposed in the center of the test piece, and a change of a temperature of the test piece with an elapse of time was confirmed by a recorder, when the voltage was applied. A voltage of 100 to 200 V was applied, a current value and a voltage value were measured in a state where the temperature of the test piece was 400° C., and the electrical resistivity was calculated from the obtained current value and voltage value, and a test piece dimension.

As to the obtained honeycomb structure, "a heat shock resistance" and "the highest temperature" were evaluated by the following method. The evaluation results are shown in Table 1.

[Heat Shock Resistance]

A treatment of first performing heating at 950° C. for ten minutes by use of a propane gas burner test machine, and leaving the honeycomb structure to stand at an atmospheric temperature of 100° C. for ten minutes was regarded as one cycle, and this heating cooling treatment was carried out as much as 100 cycles. Afterward, the honeycomb structure was observed, and the presence of cracks was confirmed. In Table 1, "no cracks" is indicated when any cracks were not confirmed, and "cracks" are indicated when the cracks were confirmed.

[Highest Temperature (° C.)]

When a voltage of 200 V was applied to the obtained honeycomb structure, temperatures of the honeycomb structure section were measured "at a position with which an end of the electrode section (the end in the peripheral direction) came in contact, and at a position with which the center point of the electrode section in the peripheral direction came in contact, in a cross section" of the honeycomb structure section "which was perpendicular to a cell extending direction". The highest temperature of the measured temperatures was the highest temperature. In the honeycomb structure section, the position with which the end of the electrode section (the end in the peripheral direction) came in contact or the position with which the center point of the electrode section in the peripheral direction came in contact was a position where the current flowed most. Moreover, this position was a portion having the highest temperature in the honeycomb structure.

In the honeycomb structure of the present example, the evaluation result of [the heat shock resistance] was "no cracks", and the evaluation result of [the highest temperature (° C.)] was "126° C.". The evaluation results are shown in Table 1. It is to be noted that in Table 1, "a cell shape" is the shape of the cells in the cross section perpendicular to the cell extending direction. "Hexagonal" indicates that the above cell shape is the hexagonal shape. "Quadrangular" indicates that the above cell shape is the quadrangular shape.

TABLE 1

| | Cell shape | No. of points where reference line overlaps with each electrode section (points) | 0.5 times center angle of electrode section (°) | Electrode section thickness (mm) | Electrical resistivity of electrode section (Ωcm) | Electrical resistivity of honeycomb structure section (Ωcm) | Heat shock resistance | Highest temp. (° C.) |
|---|---|---|---|---|---|---|---|---|
| Example 1 | Hexagonal | 2 | 35 | 0.25 | 2.8 | 40 | No cracks | 126 |
| Example 2 | Hexagonal | 2 | 50 | 0.25 | 2.8 | 40 | No cracks | 108 |
| Example 3 | Hexagonal | 2 | 65 | 0.25 | 2.8 | 40 | No cracks | 165 |
| Example 4 | Hexagonal | 2 | 70 | 0.25 | 2.8 | 40 | No cracks | 185 |
| Comparative Example 1 | Hexagonal | 0 | 28 | 0.25 | 2.8 | 40 | Cracks | 130 |
| Example 5 | Hexagonal | 2 | 35 | 0.25 | 0.05 | 40 | No cracks | 177 |
| Example 6 | Hexagonal | 2 | 35 | 0.25 | 0.1 | 40 | No cracks | 165 |
| Example 7 | Hexagonal | 2 | 35 | 0.25 | 50 | 40 | No cracks | 180 |
| Example 8 | Hexagonal | 2 | 35 | 0.25 | 100 | 40 | No cracks | 187 |
| Example 9 | Hexagonal | 2 | 35 | 0.25 | 110 | 40 | No cracks | 192 |
| Example 10 | Hexagonal | 1 | 10 | 0.25 | 2.8 | 40 | No cracks | 183 |
| Example 11 | Hexagonal | 1 | 15 | 0.25 | 2.8 | 40 | No cracks | 135 |
| Example 12 | Hexagonal | 1 | 35 | 0.25 | 2.8 | 40 | No cracks | 128 |
| Example 13 | Hexagonal | 1 | 55 | 0.25 | 2.8 | 40 | No cracks | 110 |
| Example 14 | Hexagonal | 1 | 50 | 0.01 | 2.8 | 40 | No cracks | 195 |
| Example 15 | Hexagonal | 1 | 50 | 0.025 | 2.8 | 40 | No cracks | 144 |
| Example 16 | Hexagonal | 1 | 50 | 3.0 | 2.8 | 40 | No cracks | 132 |
| Example 17 | Hexagonal | 1 | 50 | 3.5 | 2.8 | 40 | No cracks | 155 |
| Comparative Example 2 | Hexagonal | 1 | 50 | 0.25 | 2.8 | 0.5 | No cracks | 205 |
| Example 18 | Hexagonal | 1 | 50 | 0.25 | 2.8 | 1 | No cracks | 170 |
| Example 19 | Hexagonal | 1 | 50 | 0.25 | 2.8 | 200 | No cracks | 176 |
| Comparative Example 3 | Hexagonal | 1 | 50 | 0.25 | 2.8 | 210 | No cracks | 212 |
| Example 20 | Hexagonal | 3 | 62 | 0.25 | 2.8 | 40 | No cracks | 117 |
| Example 21 | Hexagonal | 3 | 65 | 0.25 | 2.8 | 40 | No cracks | 162 |
| Example 22 | Hexagonal | 3 | 70 | 0.25 | 2.8 | 40 | No cracks | 188 |
| Example 23 | Quadrangular | 2 | 50 | 0.25 | 2.8 | 40 | No cracks | 115 |
| Comparative Example 4 | Quadrangular | 0 | 40 | 0.25 | 2.8 | 40 | Cracks | 121 |

Examples 2 to 23 and Comparative Examples 1 to 4

As to honeycomb structures, "a cell shape", "the number of points where a reference line overlapped with each electrode section (points)", "0.5 times a center angle of the electrode section)(°)", "an electrode section thickness", "an electrical resistivity (Ωcm) of the electrode section" and "an electrical resistivity (Ωcm) of a honeycomb structure section" were changed as shown in Table 1. Except for such changes, the procedures of Example 1 were repeated to prepare the honeycomb structures.

As to the obtained honeycomb structures, "a heat shock resistance" and "the highest temperature (° C.)" were evaluated by a method similar to Example 1. The evaluation results are shown in Table 1.

As apparent from Table 1, it was possible to confirm that each of the honeycomb structures of Examples 1 to 23 also functioned as a heater when a voltage was applied thereto. It was also possible to confirm that the honeycomb structures of Examples 1 to 23 had an excellent heat shock resistance as compared with the honeycomb structures of Comparative Examples 1 to 4. Moreover, each of the honeycomb structures of the Examples 1 to 23 can be used as a catalyst carrier.

In Examples 1 and 2, an angle of 0.5 times the center angle α of each electrode section was from 30 to 55°. Therefore, it was possible to confirm that each of Examples 1 and 2 had an excellent heat shock resistance, a lower highest temperature, and a suitable temperature distribution in the honeycomb structure, as compared with Examples 3 and 4.

Industrial Applicability

A honeycomb structure of the present invention can suitably be utilized as a catalyst carrier for an exhaust gas purifying device which purifies an exhaust gas of a car.

DESCRIPTION OF REFERENCE NUMERALS

1: partition wall, 2: cell, 3: outer peripheral wall, 4: honeycomb structure section, 4a: one end, 4b: the other end, 5: side surface, 11: one end surface, 12: the other end surface, 13: line segment (diagonal line), 15a and 15b: vertex, 21: electrode section, 21a: one end of the electrode section, 21b: the other end of the electrode section, 21X: center portion, 21Y: extended portion, 22: electrode terminal projecting portion, 22a: base, 22b: projection, 23: conductor, 100, 101, 102, 103, 200 and 300: honeycomb structure, O: center, L: reference line, X: intersection, α: center angle, and θ: angle of 0.5 times the center angle.

The invention claimed is:

1. A honeycomb structure comprising a tubular honeycomb structure section having porous partition was with which a plurality of cells extending from one and surface to the other end surface are formed to become through channels of a fluid, and an outer peripheral wall positioned in the outermost periphery; and a pair of electrode sections arranged on a side surface of the honeycomb structure section, wherein an electrical resistivity of the honeycomb structure section is from 1 to 200 Ωcm, each of the pair of electrode sections is formed into a band shape extending in a cell extending direction of the honeycomb structure section, in a cross section perpendicular to the cell extending direction, the one electrode section in the pair of electrode sections is disposed on an opposite side to the other electrode section in the pair of electrode sections via the center of the honeycomb structure section, a shape of the cells in the cross section perpendicular to the cell extending direction is a quadrangular shape or a hexagonal shape, in the cross section perpendicular to the cell extending direction and including the electrode sections, a straight line that (i) is parallel to a diagonal line connecting two facing vertexes of the one cell and passing(ii) passes through the center of the honeycomb structure section is a reference line, and each of the electrode sections is disposed at a position to intersect with the at least one reference line, and wherein a ratio of a mass of silicon to a total mass of silicon carbide particles and silicon contained in the honeycomb structure section is from 10 to 40 mass %, and a ratio of a mass of silicon contained in the electrode section to a total mass of silicon carbide articles and silicon contained in the electrode, section is from 20 to 50 mass %.

2. The honeycomb structure according to claim 1, wherein in the cross section perpendicular to the cell extending direction, an angle of 0.5 times a center angle of each of the electrode sections is from 15 to 65°.

3. The honeycomb structure according to claim 1, wherein a thickness of the electrode section is from 0.025 to 3 mm.

4. The honeycomb structure according to claim 2, wherein a thickness of the electrode section is from 0.025 to 3 mm.

5. The honeycomb structure according to claim 1, wherein the shape of the cells in the cross section perpendicular to the cell extending direction is the hexagonal shape.

6. The honeycomb structure according to claim 2, wherein the shape of the cells in the cross section perpendicular to the cell extending direction is the hexagonal shape.

7. The honeycomb structure according to claim 3, wherein the shape of the cells in the cross section perpendicular to the cell extending direction is the hexagonal shape.

8. The honeycomb structure according to claim 4, wherein the shape of the cells in the cross section perpendicular to the cell extending direction is the hexagonal shape.

9. The honeycomb structure according to claim 1, wherein each of the electrode sections is disposed to intersect with the two or more reference lines.

10. The honeycomb structure according to claim 1, wherein the electrical resistivity of the electrode section is from 0.01 to 100 $\Omega$cm.

11. The honeycomb structure according to claim 1, wherein a conductor having an electrical resistivity lower than the electrical resistivity of the electrode section is disposed on the surface of the electrode section.

12. The honeycomb structure according to claim 1, wherein a total mass of the partition walls and the outer peripheral wall contains 90 mass % or more of a silicon-silicon carbide composite material or a silicon carbide material, and a total mass of the electrode section contains 90 mass % or more of silicon carbide particles and silicon.

13. The honeycomb structure according to claim 1, wherein a total heat capacity of the pair of electrode sections is from 2 to 150% of a heat capacity of the whole outer peripheral wall.

* * * * *